United States Patent
Tang et al.

(10) Patent No.: US 11,891,170 B2
(45) Date of Patent: Feb. 6, 2024

(54) AUTONOMOUS MULTI-PURPOSE HEAVY-LIFT VTOL

(71) Applicant: California Institute of Technology, Pasadena, CA (US)

(72) Inventors: Ellande Tang, Pasadena, CA (US); Patrick Spieler, Pasadena, CA (US); Matthew J Anderson, Pasadena, CA (US); Soon-Jo Chung, La Cañada, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 17/451,895

(22) Filed: Oct. 22, 2021

(65) Prior Publication Data

US 2022/0126994 A1 Apr. 28, 2022

Related U.S. Application Data

(60) Provisional application No. 63/104,237, filed on Oct. 22, 2020.

(51) Int. Cl.
| | | |
|---|---|---|
| *B64C 29/00* | (2006.01) | |
| *B64C 3/56* | (2006.01) | |
| *B64C 5/06* | (2006.01) | |
| *B64U 10/20* | (2023.01) | |
| *B64U 30/12* | (2023.01) | |
| *B64U 101/58* | (2023.01) | |

(52) U.S. Cl.
CPC ............ *B64C 29/0025* (2013.01); *B64C 3/56* (2013.01); *B64C 5/06* (2013.01); *B64U 10/20* (2023.01); *B64U 30/12* (2023.01); *B64U 2101/58* (2023.01)

(58) Field of Classification Search
CPC ......... B64C 29/0025; B64C 3/56; B64C 5/06; B64U 10/20; B64U 30/12
See application file for complete search history.

(56) References Cited

U.S. PATENT DOCUMENTS

| | | | |
|---|---|---|---|
| 11,072,421 B2 | 7/2021 | Shi et al. | |
| 2014/0231593 A1* | 8/2014 | Karem | B64C 1/0009 244/45 R |
| 2018/0105279 A1* | 4/2018 | Tighe | B64D 27/24 |
| 2018/0215465 A1* | 8/2018 | Renteria | B64C 25/10 |
| 2019/0291860 A1* | 9/2019 | Morgan | B64C 39/024 |
| 2021/0197965 A1* | 7/2021 | Kunz | B64C 39/04 |

* cited by examiner

*Primary Examiner* — Brady W Frazier
*Assistant Examiner* — Shanna Danielle Glover
(74) *Attorney, Agent, or Firm* — KPPB LLP

(57) ABSTRACT

An air transport vehicle that capitalizes on the strengths and complexities of a fixed and rotary winged aircraft. The air transport vehicle comprises a body aerodynamically designed to avoid substantial drag. The vehicle has a plurality of rotors configured to generate vertical thrust with a rear rotor configured to generate forward thrust. Additionally, each of the rotors are connected to the fixed wing elements and the fixed wing is positioned about the center of mass of the fuselage. Furthermore, each of the rotors are positioned at a fixed tilt angle such that the stability of the vehicle is maintained in a number of different flight configurations.

18 Claims, 31 Drawing Sheets

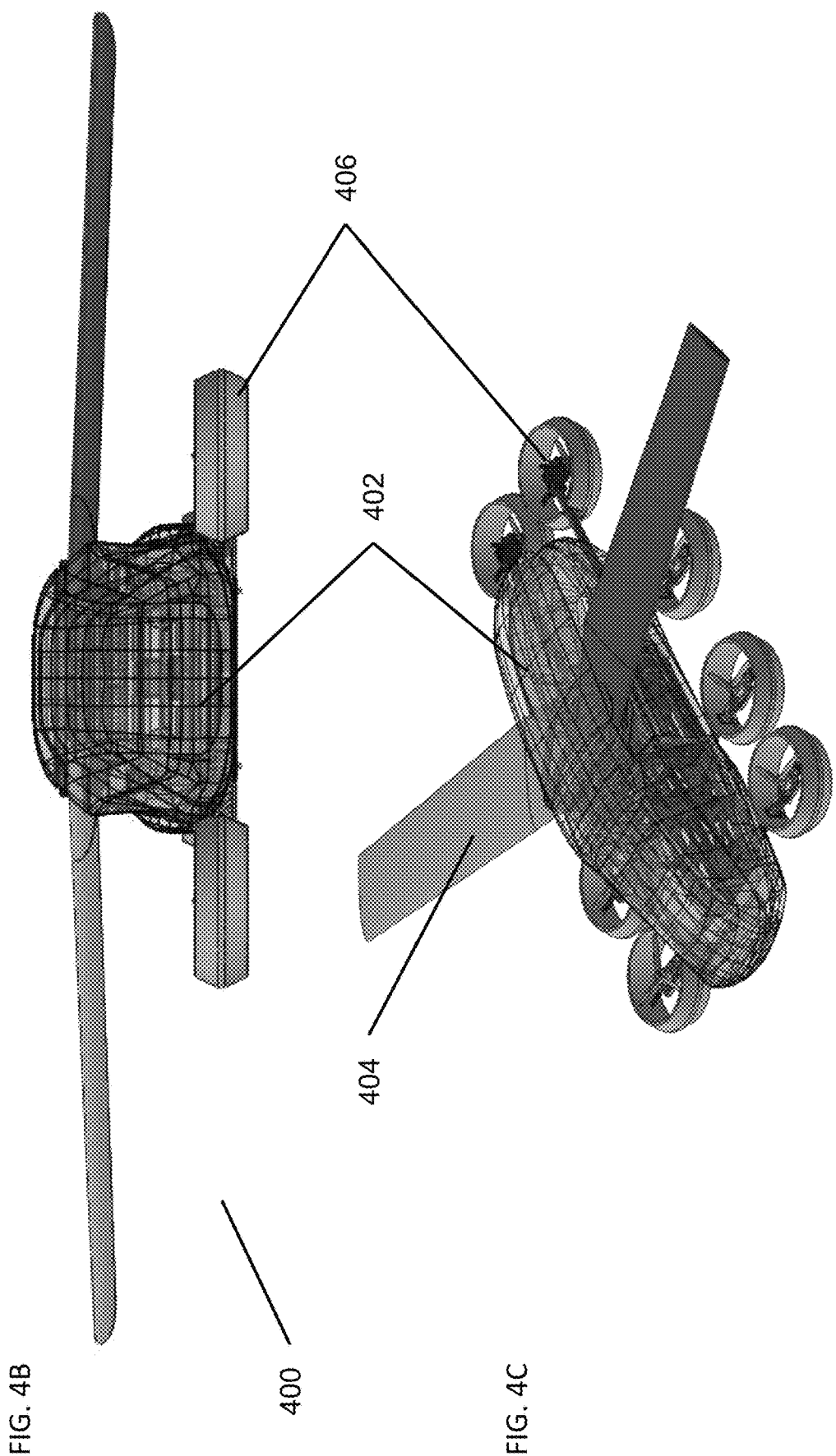

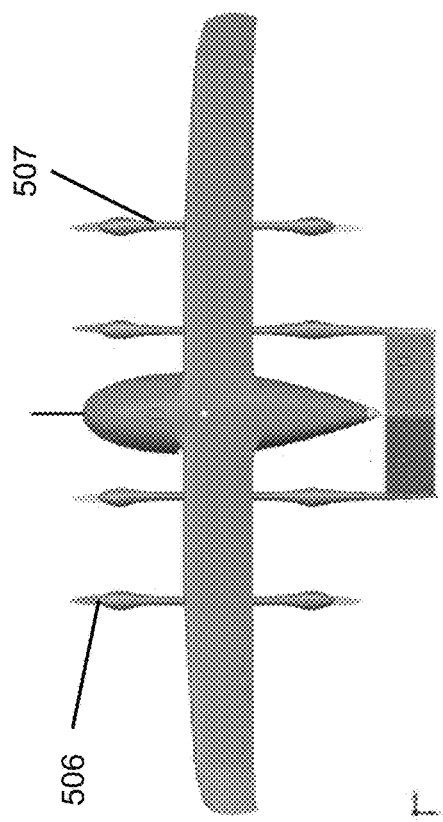
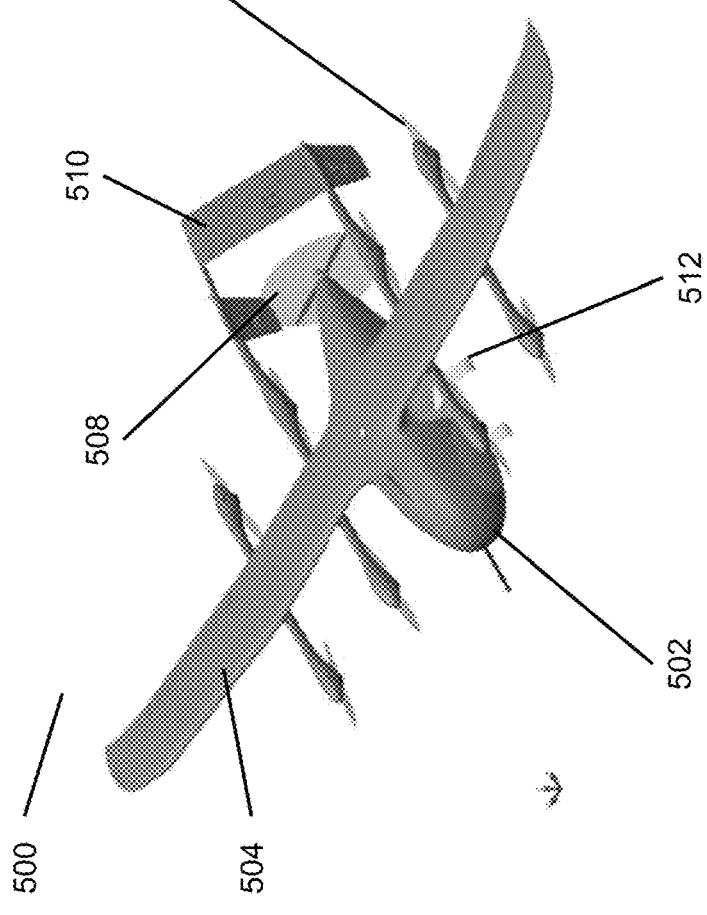
FIG. 5A
FIG. 5B

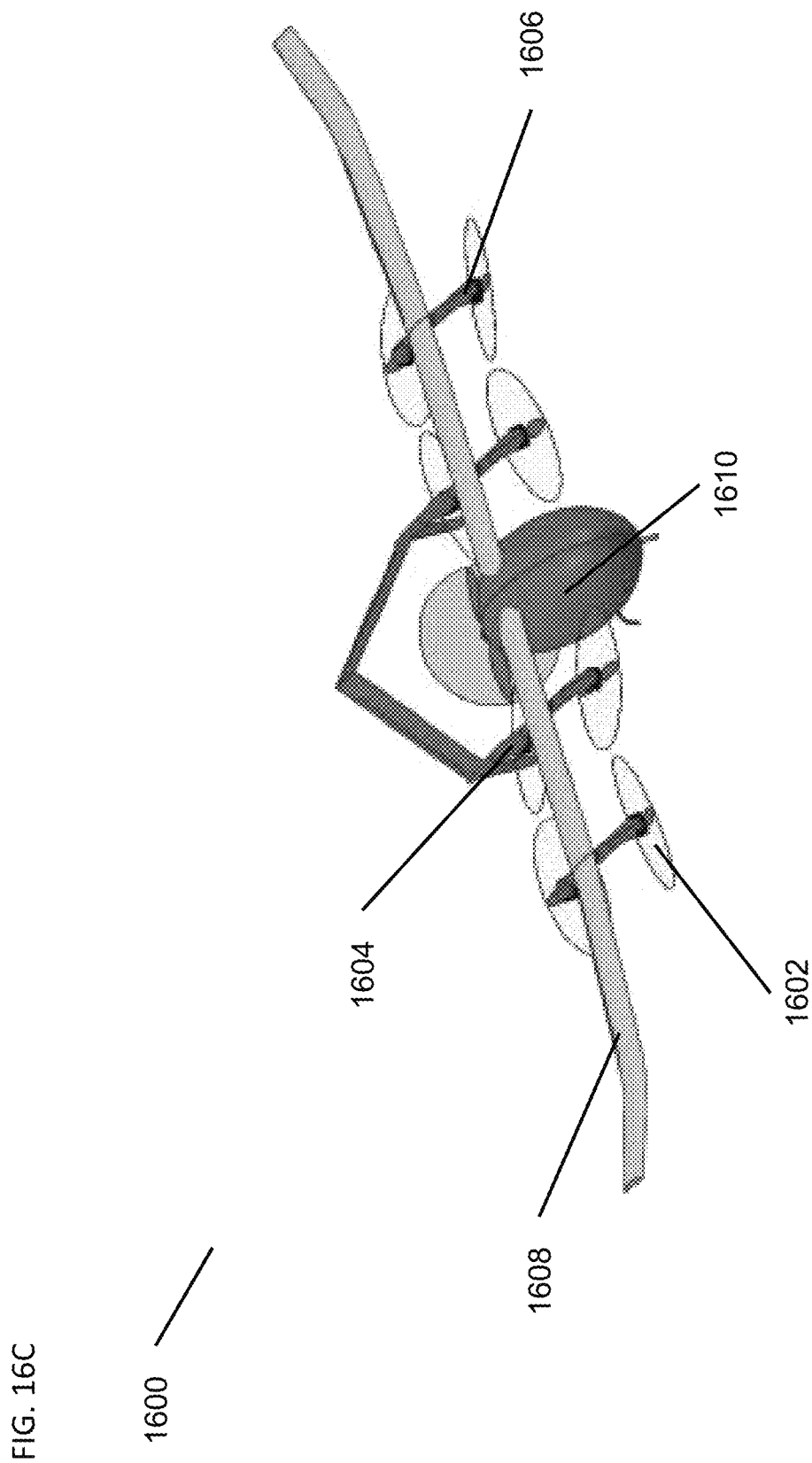

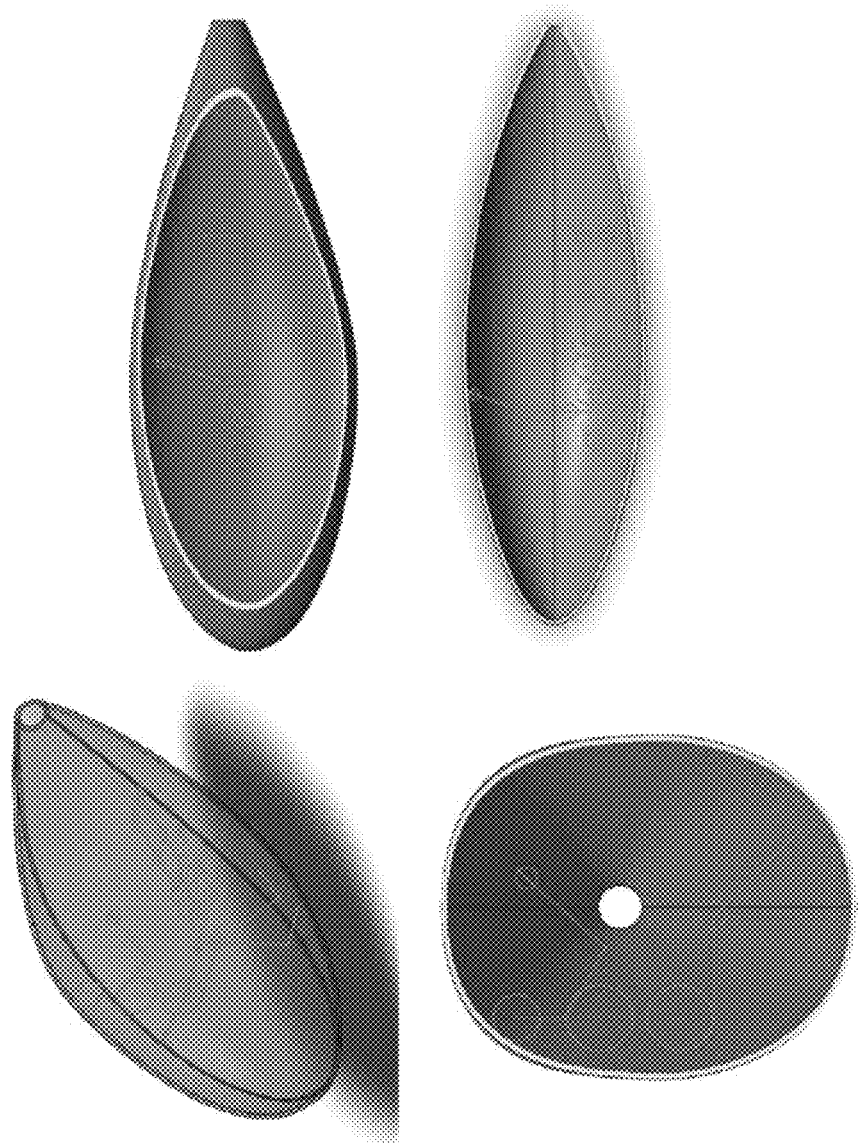
FIG. 26 — 2600

AUTONOMOUS MULTI-PURPOSE HEAVY-LIFT VTOL

CROSS-REFERENCE TO RELATED APPLICATIONS

This application claims priority to U.S. Provisional Patent Application No. 63/104,237 filed on Oct. 22, 2020, the disclosure of which is herein incorporated by reference in its entirety.

FIELD OF THE INVENTION

This application generally refers to autonomous flying aircrafts. Specifically, the application is directed to autonomous flying aircrafts capable of transporting people or other payloads in a variety of environments including urban environments.

BACKGROUND

Smaller individual air transport vehicle systems are increasingly playing a larger role in today's society. With rapid improvements in design as well as decreases in size and cost, small aerial aircrafts are being used in more areas of everyday life. Some uses have included transporting small packages, and providing logistical and tactical support in military operations. In some situations, the air transport vehicles are adding autonomy to the systems to remove the human control element. There is however, a need for improved systems and methods for rapid and cost effective deployment of an air transport that is capable of being deployed in a variety of environments.

SUMMARY OF THE INVENTION

Systems and methods in accordance with many embodiments of the invention are directed to an improved transport system that may be utilized in variety of situations including the field of medical air transport.

Many embodiments are directed to an air transport vehicle with a fuselage that has an outer surface that defines an upper section, a bottom section, a leading and trailing surface and an inner surface. The inner surface also defines an inner cavity. The vehicle is equipped with an airfoil disposed near the upper section, where the airfoil has an elongated body that extends outwardly from the outer surface of the fuselage and wherein the airfoil is disposed about a center of mass of the fuselage. The vehicle has a plurality of boom elements connected to a lower surface of the airfoil, each of the boom elements has an elongated body with a first end and a second end, where the first end is in a direction similar to the leading surface of the body and the second end is in a direction similar to the trailing surface. Additionally, there are a plurality of rotors connected to the plurality of booms, where at least one of the plurality of rotors is connected to the first end and at least another of the plurality of rotors is connected to the second end. The vehicle also has a tail element connected to at least a second set of booms wherein the at least second set of booms is disposed on the wings near the fuselage and wherein the tail element is disposed on a rearward portion of the at least second set of booms.

In other embodiments, the airfoil is foldable having a folding axis that is locate outward from the booms and wherein the airfoil has an open and a closed configuration.

In still other embodiments, each of the plurality of rotors are connected to the booms with a fixed tilt angle.

In yet other embodiments, the fixed tilt angle is no more than 11.3 degrees.

In still yet other embodiments, the fixed tilt angle of some of the plurality of rotors is selected from a group consisting of tilted towards the fuselage, tilted away from the fuselage, and tilted towards the wings.

In other embodiments, the air foil has one or more control surfaces.

In still other embodiments, the tail element has an "A" shape configuration having at least two stabilizers each of the stabilizers are connected to the at least second set of booms and extend upwardly at an angle towards an apex of the tail.

In yet other embodiments, the tail element further comprises at least two vertical stabilizers that extend downward from a connection point of the at least two stabilizers and the at least second set of booms.

In still yet other embodiments, each of the at least two stabilizers have at least one control surface.

In other embodiments, each of the at least two vertical stabilizers have at least one control surface.

In still other embodiments, the air transport vehicle has a horizontal thruster rotor disposed at an end of the fuselage near the trailing surface and configured to generate a forward thrust for the vehicle.

In yet other embodiments, the horizontal thruster rotor is positioned such that it sits between the trailing surface of the fuselage and a leading edge of the tail.

In still yet other embodiments, the air transport vehicle has a landing mechanism disposed on the bottom section of the fuselage.

In other embodiments, the landing mechanism is selected from a group consisting of landing skids and wheels.

In still other embodiments, the fuselage has a tear drop shape such that the leading surface is contoured and the trailing surface is tapered toward a connection point.

In yet other embodiments, the fuselage has at least one opening such that the opening is configured to allow at least one passenger to be positioned within the internal cavity of the fuselage, and wherein the positioning of the passenger does not disturb the center of mass of the fuselage.

In still yet other embodiments, the air transport vehicle has a plurality of openings that allow for the positioning of control electronics for the vehicle.

In other embodiments, the fuselage is configured to hold at least two passengers.

In still other embodiments, wherein each of the plurality of rotors has a shroud the encircles each of the plurality of rotors.

Additional embodiments and features are set forth in part in the description that follows, and in part will become apparent to those skilled in the art upon examination of the specification or may be learned by the practice of the disclosure. A further understanding of the nature and advantages of the present disclosure may be realized by reference to the remaining portions of the specification and the drawings, which forms a part of this disclosure.

BRIEF DESCRIPTION OF THE DRAWINGS

The description will be more fully understood with reference to the following figures, which are presented as exemplary embodiments of the invention and should not be construed as a complete recitation of the scope of the invention, wherein:

FIGS. 4A through 4C illustrate an aerial transport aircraft with rotary winged elements and partially fixed wing elements.

FIG. 5A illustrates an isometric view of an aerial transport aircraft in accordance with embodiments of the invention.

FIG. 5B illustrates a top view of an aerial transport aircraft in accordance with embodiments of the invention.

FIGS. 16A through 16C illustrate an air transport vehicle with tilted rotors in accordance with embodiments of the invention.

FIG. 26 illustrates a fuselage of an air transport vehicle in accordance with embodiments of the invention.

DETAILED DESCRIPTION OF THE INVENTION

Figure 1B:
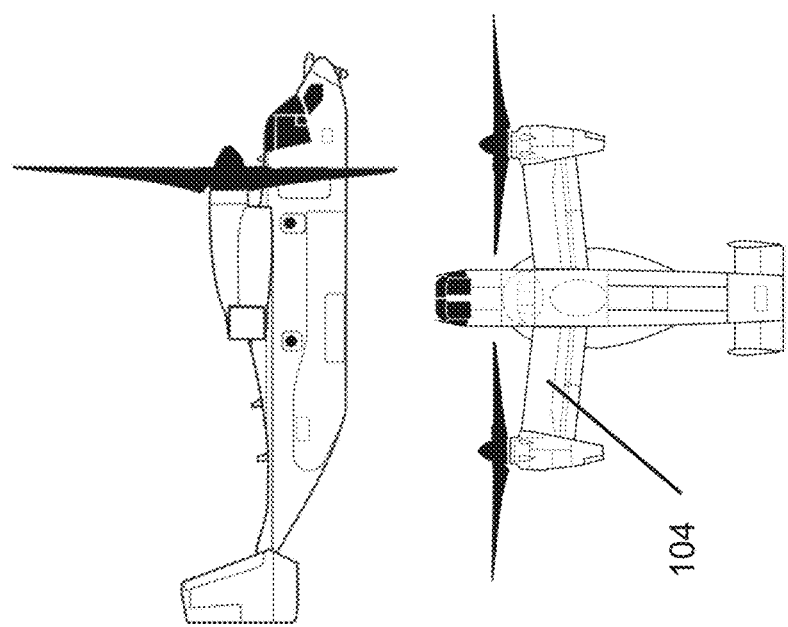
FIGS. 1A and 1B illustrate a military style aircraft that utilizes both fixed and rotary winged elements in accordance with known art.

Turning now to the drawings, systems and methods for automated air transport systems are illustrated. Numerous embodiments, are directed to an automated air transport system that has a fuselage or a body configured to hold at least two occupants within an internal cavity of the fuselage. Additionally, many embodiments are configured with both rotary and fixed wing components where the fixed wing portion is connected to an upper portion of the fuselage. The fixed wing component has elongated body that extends outwardly from the external surface of the fuselage and is disposed in alignment with the center of mass of the fuselage. The automated air transport has multiple rotary wing components disposed about the fixed wing component and are configured to generate upward thrust for the aircraft. Additionally, many embodiments incorporate a push rotor or rear thrust rotor that is positioned at a rear portion of the fuselage. In numerous embodiments, the aircraft has a tail configuration placed to the rear of the fuselage. In many embodiments, the various rotary wing components are configured to be cantered or tilted at a specific angle such that the thrust force generated is produced in a certain vector or angle with respect to the aircraft. This allows for improved overall control of the aircraft.

In a number of embodiments, control systems are utilized in conjunction with one or more power systems and/or one or more sensor systems to allow for autonomous flight capabilities.

In several embodiments, the air transport vehicle system is configured as a medical air transport vehicle system. Medical air transport can play an important role in expanding critical care capabilities of emergency medical services (EMS) by providing higher level care at the scene as well as expedient access to trauma centers. Many factors influence a dispatcher's decision to employ either a fixed wing aircraft or medically outfitted helicopter, with the primary objective of providing the appropriate level of triage, whilst safeguarding crew and patient. Weather, air-traffic patterns, distance to the nearest trauma center, and/or practical access to the nearest trauma center (i.e. access to nearby airstrip, or helipad) can all influence the likelihood and type of dispatch.

Subjective protocols and trainings are often used to attempt to best determine the necessity of air EMS, balancing the need of rapid care with the severity of outcome, risk, and cost, for both crew and patient. In many instances, air EMS are employed when a ground-based service is deemed inappropriate (i.e. too slow, no access, or both). Due to the cost and requirement of infrastructure, air EMS is considered a second, albeit, effective option. There exist two primary options within an air ambulance class: a specially outfitted helicopter (MEDEVAC in military parlance) and a medically-equipped fixed wing aircraft. Helicopters are range-limited while fixed wing aircraft can require nontrivial infrastructure (e.g. airstrip) to take off and land.

Helicopters have had a long history of use in the medical setting due to their ability to get into areas of limited accessibility such as mountainous terrain. Despite the helicopters ability to access limited areas they still face a number of drawbacks that make them less than ideal for various medical transport situations. For example, helicopters are often unable to land due to the combination of the terrain and rotor size. Helicopters are also limited in their ability to rescue patients because they can merely dangle stretchers below the helicopter, which can present difficulties in actually removing patients. Furthermore, helicopters tend to be loud making their use in urban areas unpleasant.

In addition to the various limitations of both fixed wing and rotary winged aircraft, most airborne aircrafts suffer from human limitations; meaning they often require human operators to function. Human operators require extensive training to operate any airborne aircraft and are also often subject to fatigue and physical limitations. This can often result in human error when operating aircrafts, which can lead to dangerous mistakes during rescue operations. Accordingly, there arises a need to more automated systems that can operate in complex environments and provide safe and efficient operations.

A flying automated ambulance, according to various embodiments of the invention, may help to bolster existing EMS protocols by providing a more objective toolset, namely a medical transport aircraft that is aware of its capabilities far in advance of an emergency and free from in-situ dispatcher and pilot judgement. This can include (but is not limited to) autonomous "decision-making" regarding weather adjustments, ground and air traffic, location of the nearest appropriate trauma center, and fastest and safest trajectory to and from a trauma scene. Furthermore, various embodiments can involve the use of redundant propulsion systems to increase flight stability that may aid in the ultimate deployment and recovery missions that an automated ambulance or air transport vehicle may be used for. Furthermore, flying automated ambulances in accordance with several embodiments may help avoid drawbacks of traditional aircraft by combining the strengths of a helicopter and fixed wing aircraft in one practicable aircraft. Combining the strengths of the two systems can help to overcome some of the various limitations.

Figure 1A:
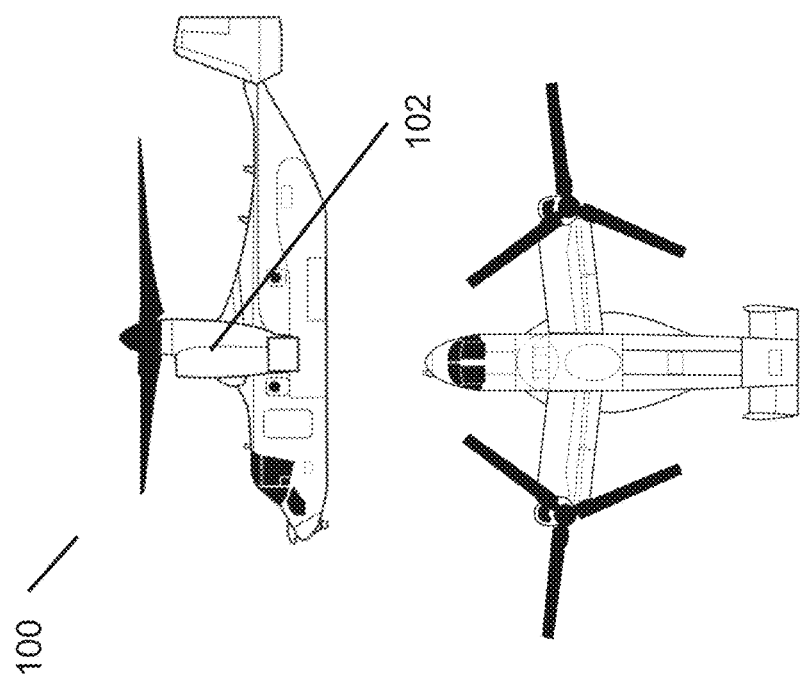

Turning now to the drawings, many embodiments of an automated heavy-lift VTOL that combines many of the benefits of a fixed winged and rotary winged aircraft. FIGS. 1A and 1B illustrate a military style aircraft 100 with that utilizes both rotary winged elements 102 and fixed winged elements 104. The aircraft can operate in a Vertical Take Off and Landing (VTOL) capacity by rotating the rotary winged elements 102 into a vertical position (1A) and utilize the thrust generated to lift the aircraft 100 into the air. The rotary winged elements 102 can then be rotated into a horizontal configuration 104 (1B). During the rotation the thrust generated can be used to initiate a forward movement that can be fully articulated with the rotors in the horizontal position. While in the horizontal position the rotors can provide the thrust necessary to propel the aircraft forward while capturing the effects of the fixed winged elements 104.

Figure 3:
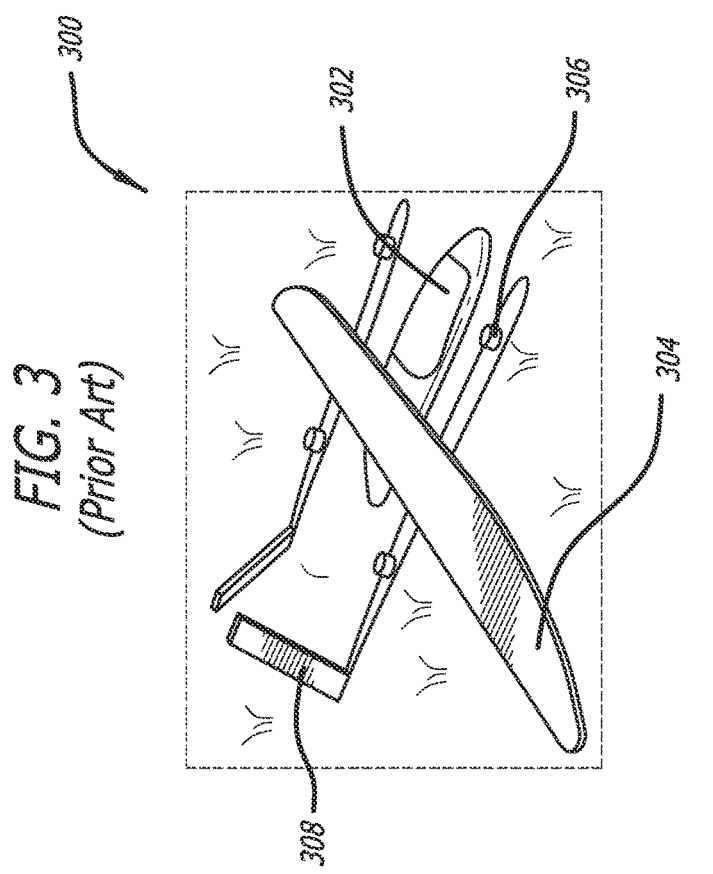
FIGS. 2 and 3 illustrate unmanned aerial drones with fixed and rotary winged elements that are known in the art.
Figure 2:
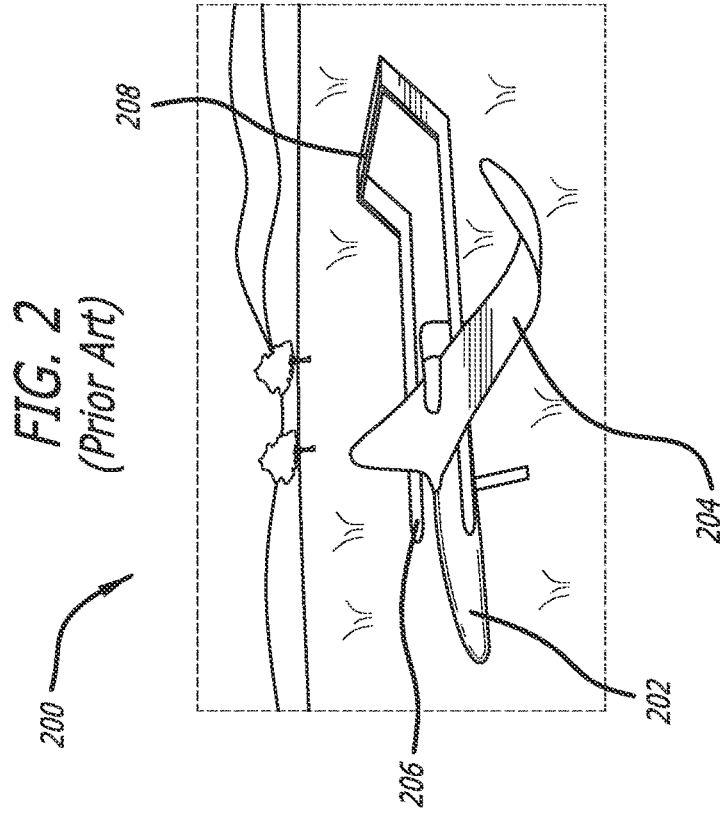

Likewise, FIGS. 2 through 4C illustrate other aircrafts that utilize the combination of fixed and rotary winged elements. For example, FIGS. 2 and 3 show smaller drone type elements (200 & 300) that have a singular body element or fuselage (202 & 302) that is connected to a fixed wing (204 & 304). Each aircraft (200 & 300) also has multiple rotary winged elements or rotors (206 & 306). The aircraft in FIG. 2 positions the fixed wing element 204 partially integrated with the fuselage 202 and near the rear portion of the fuselage. Similarly, the aircraft in FIG. 3 illustrates the fixed wing element 304 at the rear portion of the fuselage 302, however it is positioned on top of the fuselage 302. Additionally, such aircrafts are equipped with tail fins or empennages (208 & 308) that can be used for flight stabilization. The rotors (206 & 306) can be positioned in different locations with respect to the fixed wing and the fuselage. Additionally, the aircrafts are equipped with a push rotor (210 & 310) positioned near the rear of the aircraft to provide the forward thrust.

Figure 4A:
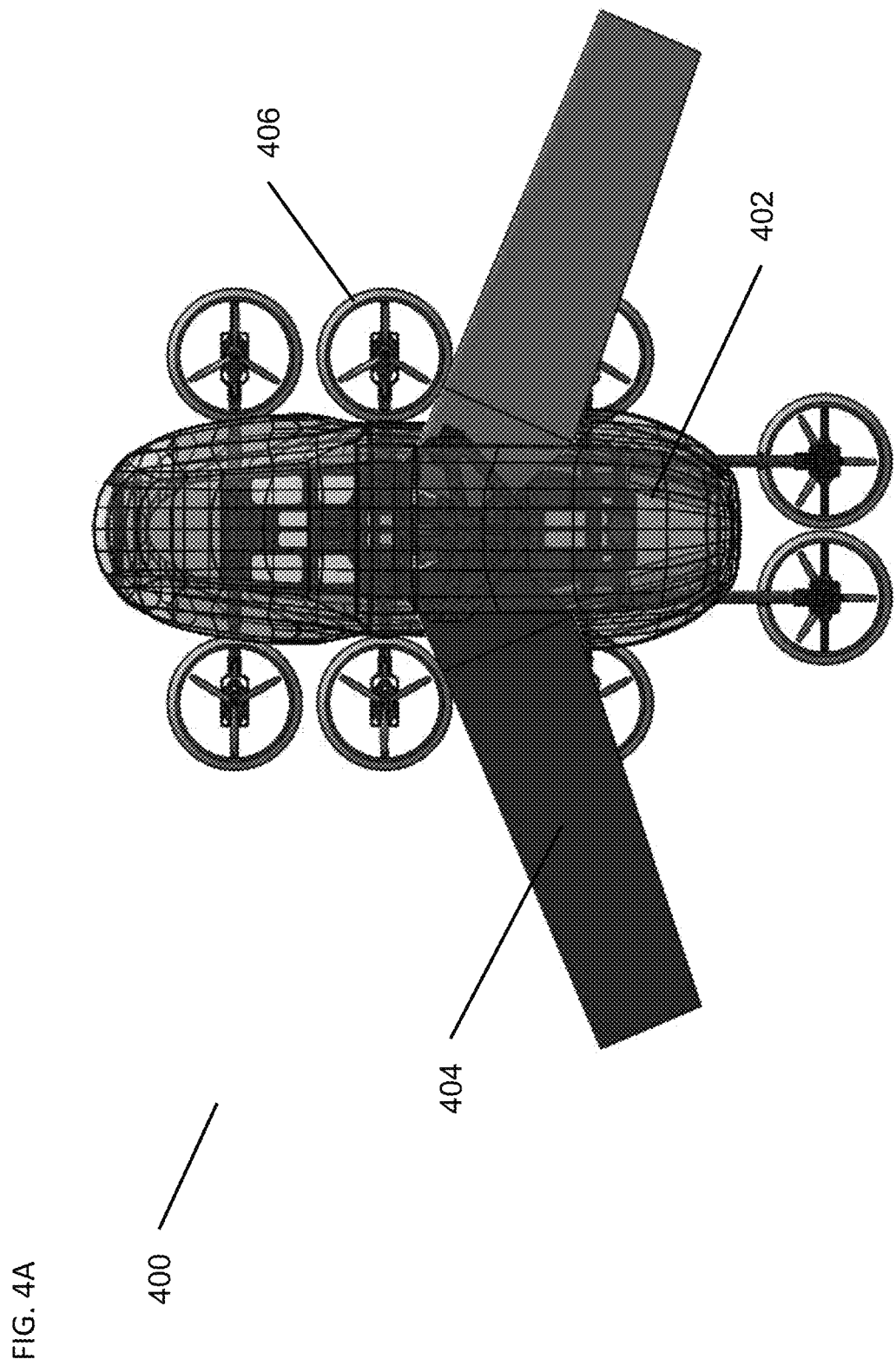

Although such aircrafts may appear similar to the various embodiments illustrated herein, the complexities in developing an aircraft that is capable of carrying passengers and maintaining a continuous flight can be difficult to model; especially within the form factor of a small aerial drone like those shown in FIGS. 2 and 3. FIGS. 4A through 4C illustrate a preliminary version of an embodiment of an aerial transport aircraft, which can be more fully represented in U.S. Pat. No. 11,072,421, the disclosure of which is incorporated by reference herein in its entirety. The aircraft 400 utilizes a fuselage 402 with fixed wings or fixed wing elements 404 that can be retracted into a portion of the fuselage. Additionally, the aircraft 400 has multiple rotors 406 that are positioned about the fuselage 402 and are situated to provide lift. The rotors 406 can be tilted to direct the thrust in a number of directions creating stability in flight as well as forward and/or vertical thrust. The wing elements 404 can be extended to provide lift during long range flights thereby reducing the number or rotors 406 that are needed for the sustained flight. This is one of the various advantages of combining the use of rotary winged elements with fixed wing elements.

Such aircraft and the various configurations were specifically designed to carry a human payload that can adjust or shift during flight. Additionally, the payload can vary from mission to mission. Therefore, the design and control of such aircraft systems can create various center of mass issues when designing an aircraft. As should be appreciated, the change in center of mass with respect to the fuselage and other components of the aircraft can dramatically affect the stability of the aircraft during flight. This can create issues for human pilots as well as automated systems. Accordingly, many embodiments described herein are aimed at resolving the complexities of an ever-changing center of mass and payload configuration. As such many embodiments described herein illustrate an air transport vehicle that utilizes the advantages of both fixed and rotary winged aircraft in a unique configuration that allows for safe and efficient transport of occupants.

FIGS. 5A and 5B illustrate an embodiment of an air transport vehicle 500 that is configured to transport multiple occupants that specifically address the complex issues with respect to the center of mass and ensuring a balanced and safe aircraft. Many such embodiments have a fuselage 502 that is centrally located with respect to the overall aircraft. The fuselage has an internal compartment (not shown here) that is capable of supporting several occupants such as an injured person and a paramedic. The aircraft 500 is also equipped with a fixed wing element 504 that is connect to the fuselage at the predetermined center of mass such that the balance of the aircraft 500 is maintained throughout flight. The aircraft 500 can generate a vertical lift on by way of a number of rotary winged elements or rotors 506. The rotors 506 can be fixed to the aircraft 500 in a number of ways. In some embodiments, the rotors 506 are mounted to the wing 504 through one or more booms 507. Although not shown in FIGS. 5A and 5B, some embodiments may cover or encircle each of the rotors with a shroud.

The booms 507 can extend to the front and rear of the wing such that the rotors 506 are separated from each other and are able to provide adequate vertical thrust without interference with the other rotors 506. In various embodiments, the aircraft 500 can be equipped with a rear rotor 510, that can provide a forward thrust. The rear rotor 508 can provide the thrust necessary to allow the wings 504 to generate lift and thus relieve the need for the other rotors 506 to have complex rotational elements or complex control algorithms to transition between vertical and horizontal fight with only one set of rotors.

In order to help balance the aircraft 500 and improve stability, many embodiments are equipped with an empennage or tail 510 that is positioned to the rear of the fuselage 502. The tail 510 in some embodiments can take on an "A" shape or a reversed "V" shape. Such configurations can allow for the use of additional control surfaces as well. The A-tail configuration can help to efficiently achieve the required weathercock stability of the aircraft. Additionally, the A-tail configuration can allow for the fuselage to be shortened while keeping the original tail lever arm, thus enabling a thruster motor 510 to be brought closer to the center of mass; which would increase the flexibility in design with weight and balance. As can be further appreciated, many embodiments may include the use of some type of landing gear 512 or landing component that can allow the aircraft to safely land on the ground without disturbing the occupants. This can be essential to safe landing when transporting an injured passenger. The landing gear 512 can be any number of devices such as skids, similar to helicopters, and/or wheels. As can be appreciated the landing gear 512 can be fixed and/or retractable.

The aircraft configuration is an important part of the ability for the aircraft to maneuver and operate in the various situations it is designed to operate. As such, it is important to consider the placement of the various components of the aircraft that allow it to fly most efficiently. In many embodiments, the wing element(s) 504 can be positioned such that it is centered on the center of mass of the aircraft 514. In numerous embodiments this specific positioning can allow for a number of aircraft configurations that improve the overall flight stability and control in nearly every situation. For example, the position of the wings over the center of mass 514 can allow for a shorter fuselage configuration and thus reduce the overall length of the aircraft. This can improve the form factor; allowing the aircraft 500 to be maneuvered into otherwise difficult to reach locations. Additionally, the position of the wings and subsequently the rotors 506 can improve the overall stability of the aircraft when it interacts with unknown or additional forces such as external winds.

Figure 6:
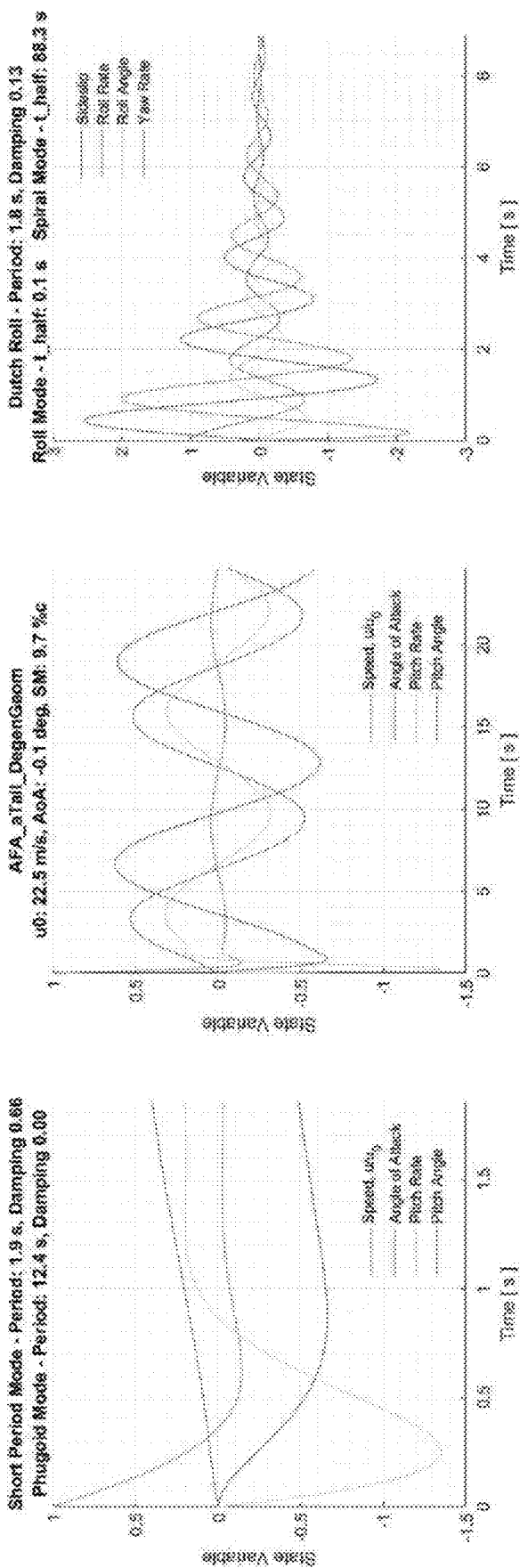
FIG. 6 represents several graphical illustrations of an aircraft response to a disturbance in accordance with embodiments of the invention.
Figure 7:
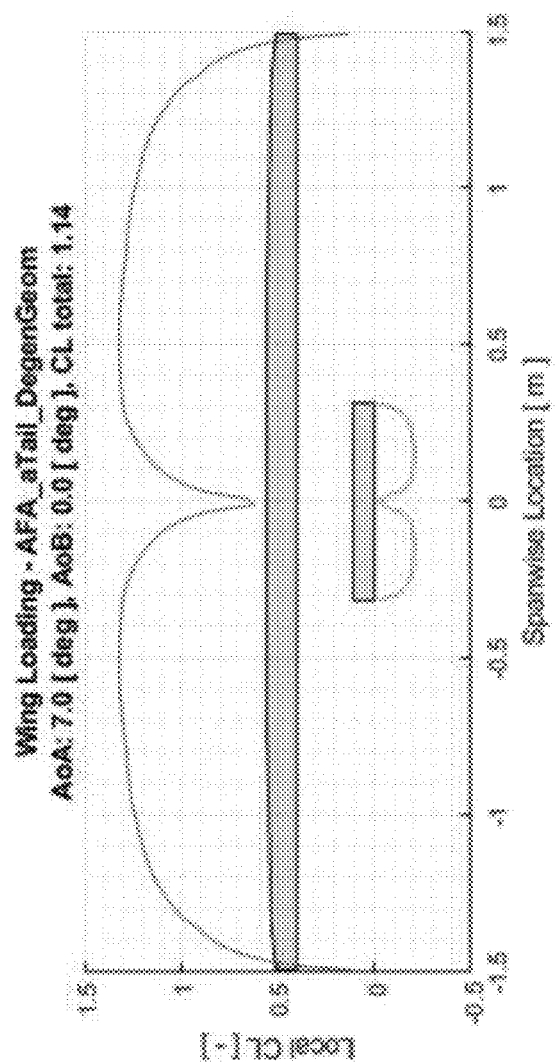
FIG. 7 is a graphical illustration of wing loading characteristics in accordance with embodiments of the invention.

For example, FIG. 6 is a graphical illustration of various flight stability characteristics or responses to external forces. The graphs illustrate the response to an embodiment of the aircraft to a disturbance in an angle-of-attack (longitudinal) and a disturbance in an angle-of-sideslip (lateral) for a nominal center of mass location of the aircraft. The graphs illustrate the quality of the damping and period to be desirable and demonstrating desirable stability characteristics. Additionally, FIG. 7 is a graphical illustration of wing loading characteristics that can show the unlikelihood for the aircraft to have a tip stall under normal conditions, thus having benign stall characteristics.

Figure 8:
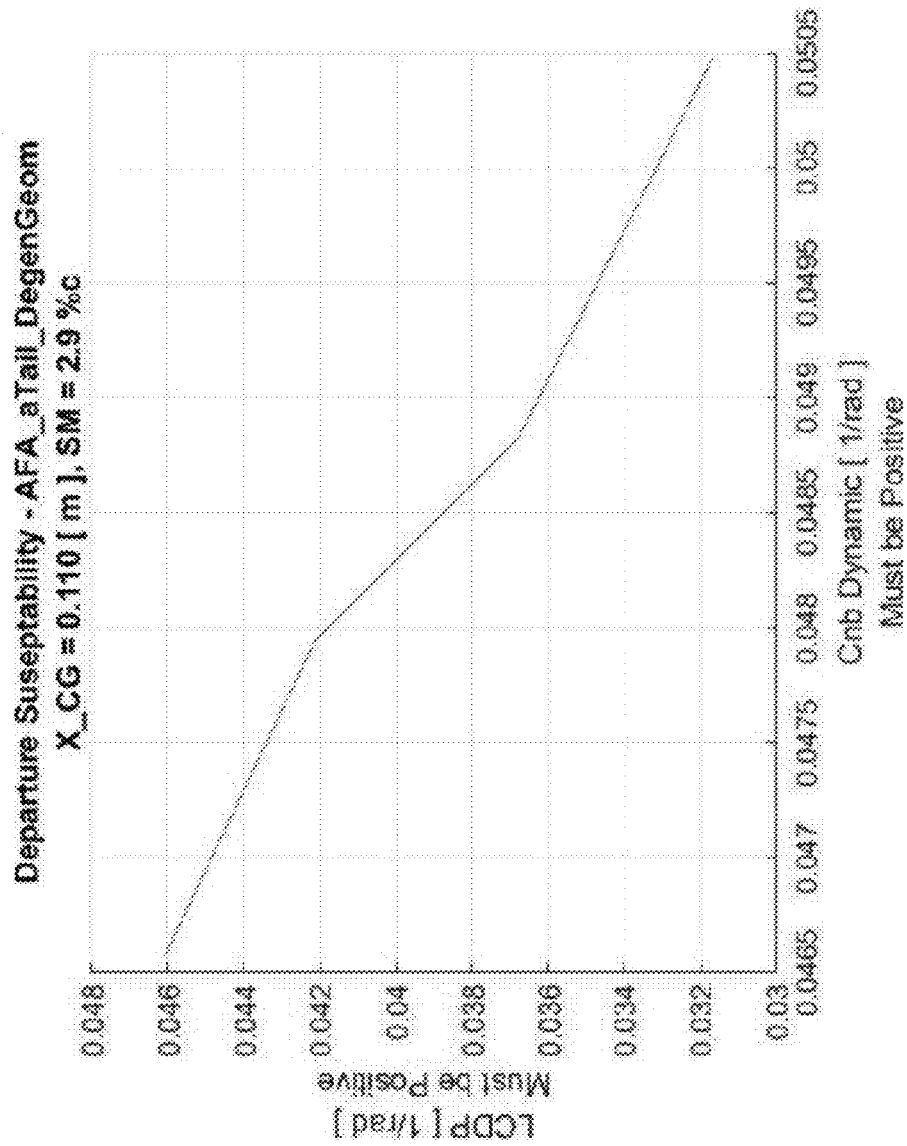
FIG. 8 is a graphical illustration of the departure susceptibility of an air transport vehicle in accordance with embodiments of the invention.

Departure susceptibility is the tendency of an aircraft to enter a spin at high-angles-of-attack. The analysis of the departure susceptibility uses the lateral control departure parameter (LCPD) and directional stability coefficient to estimate the departure resistance of the aircraft to unwanted forces. Ideally, the aim is to have appositive LCPD and departure resistance greater than 0.004. Accordingly, FIG. 8 illustrates the ability for various embodiments of an aerial transport aircraft to maintain a positive LCDP and a sufficiently large directional stability coefficient to maintain a good departure resistance. Much of this is attributed to both the overall configuration of components and the placement of such about the center of mass. Additionally, the benefits to such configurations will be discussed with respect to positioning of passengers in the fuselage of the aircraft.

Embodiments of Wing Design

Figure 9:
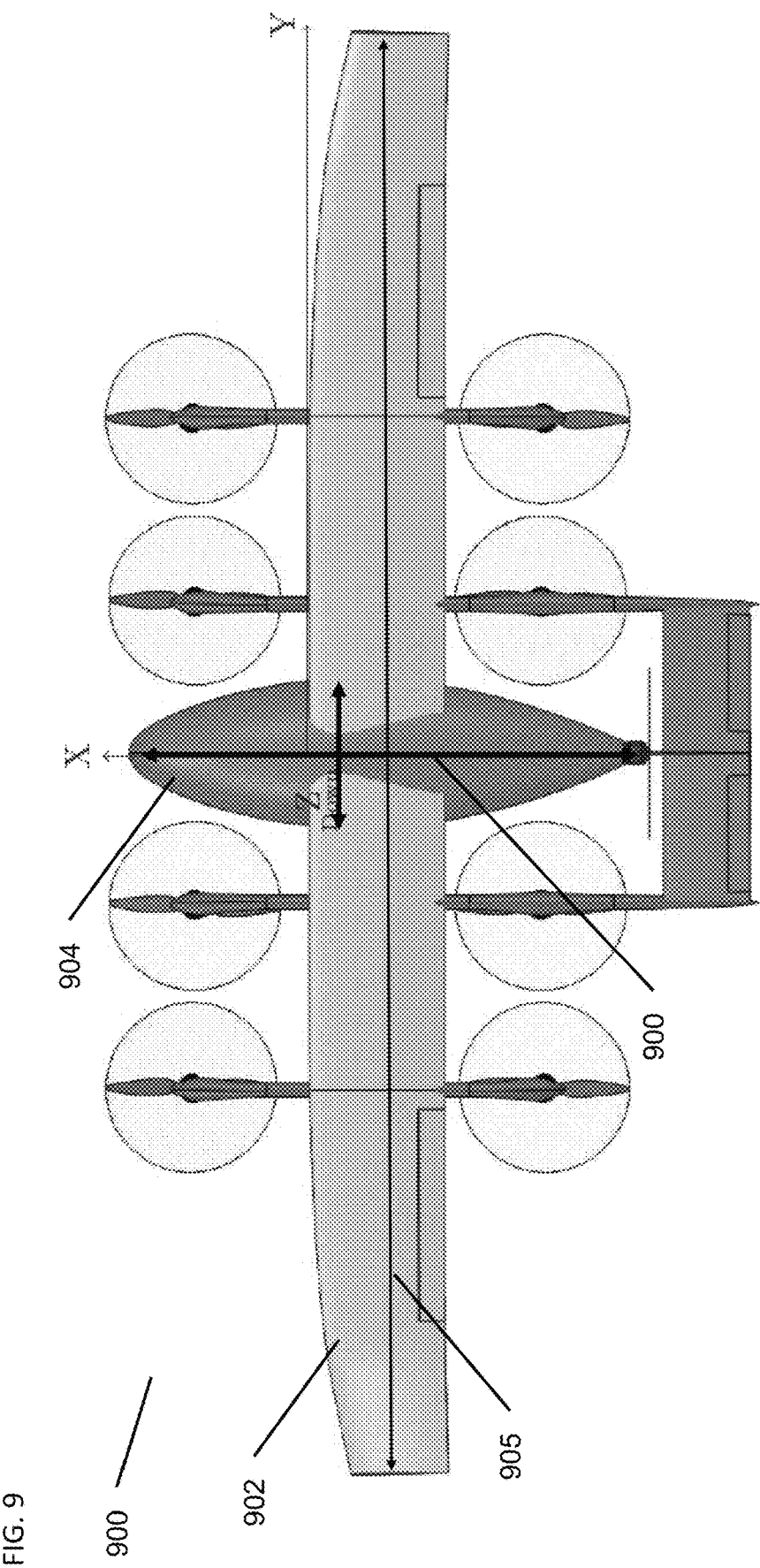
FIG. 9 illustrates a top view of an air transport vehicle in accordance with embodiments of the invention.

As can be appreciated the wing design in any aerial aircraft that relies upon sustained long-range flight can be crucial to the effectiveness of the aircraft. For example, wing profiles or airfoil design can help to ensure the best lift to drag ratio is achieved by the wings. This is necessary for fixed wing elements because, their primary function is to provide sufficient lift to the aircraft while minimizing drag. In numerous embodiments, the wing elements are designed to be wide in relation to the fuselage thus allowing for more surface area to generate lift and provide lift to the aircraft over longer periods of time. This can help to improve the flight efficiency of the aircraft. FIG. 9, for example, illustrates a top view of an embodiment of an aerial transport aircraft 900 with a set of wings 902 disposed on the upper surface of a fuselage 904. When compared to the width or length of the fuselage the wingspan or length is of the wings 905 is considerably larger than the body length of the fuselage 906. This can be advantageous in providing a greater amount of lift to the aircraft during sustained forward flight. In some embodiments the surface area of the wings 902 can be orders of magnitude larger than the fuselage 904. For example, in some embodiments, a scaled version of the aircraft 900 can have wings with a surface area of 1.63 $m^2$ compared to a body surface area of 0.086 $m^2$. While it may seem counterintuitive to have a larger surface area the overall profile or airfoil design can be optimized to produce more lift and less drag over that surface area.

Figure 10:
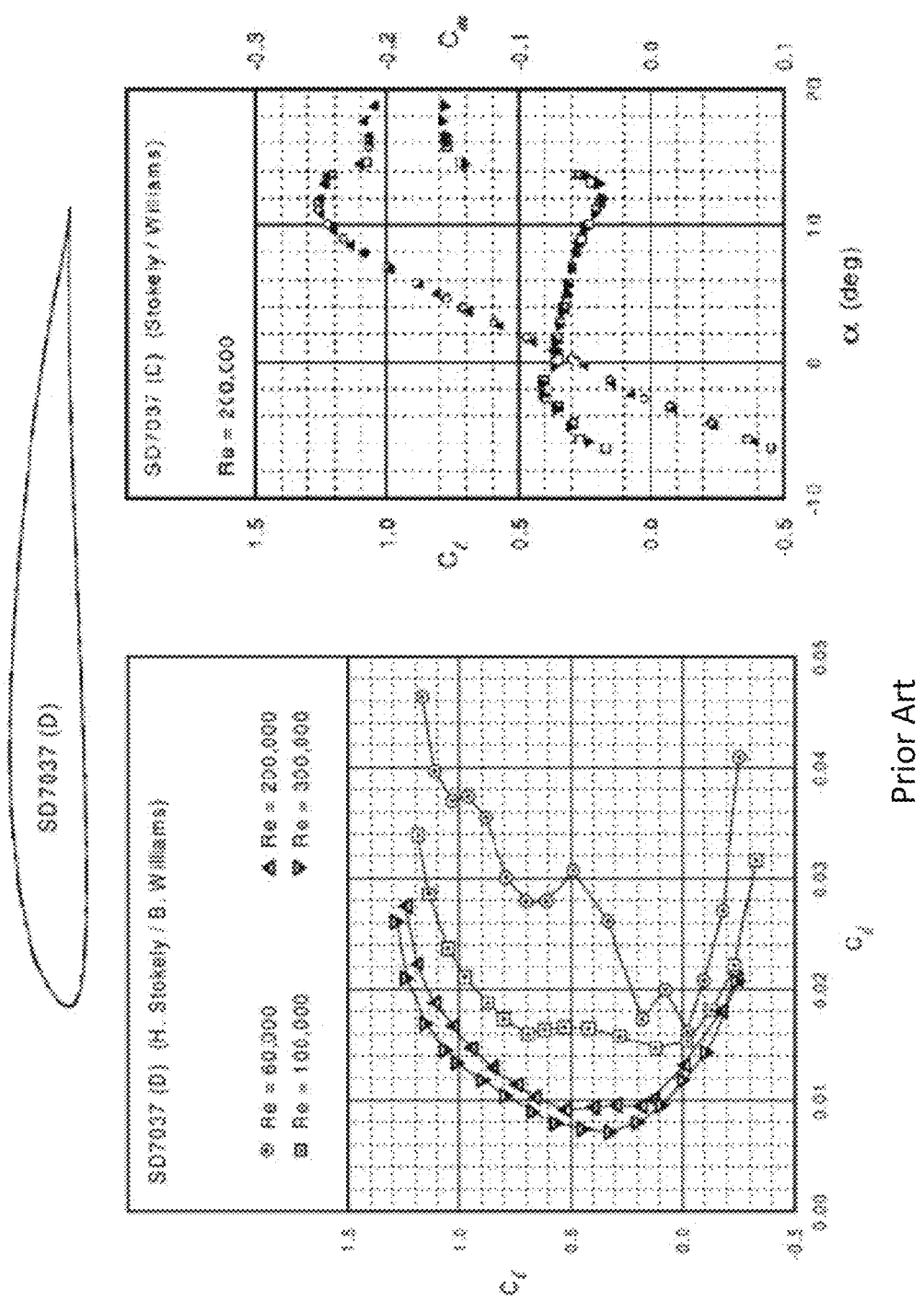
FIG. 10 illustrates an airfoil design and data characteristics in accordance with known art.

The airfoil design of the wings can take on any suitable configuration that is capable of providing sufficient lift. Lift is generated when airflow over the top and bottom surface of the wing creates a pressure differential in which the pressure on the top surface is less than the pressure on the bottom surface, thus generating lift. FIG. 10 illustrates an example experimental airfoil design and data sets a respective airfoil design that can be used on the wing of an aircraft in some embodiments. Such designs can have relatively low Reynolds number; resulting in better lift/drag ratios and improved flight characteristics such as strength and rigidity. These represent only a couple of various types of airfoil designs that could be used in the various embodiments of an aerial transport aircraft. As can be appreciated, the airfoil design can be applied to a number of different surfaces outside of the wing. For example, any surface, such as the tail can have aerodynamic surfaces with an airfoil design that can help to regulate the flow of air in and around the aircraft.

Figure 11:
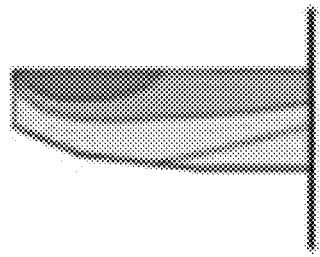
FIG. 11 illustrates a Scheumann wing design in accordance with known art.
Figure 11:
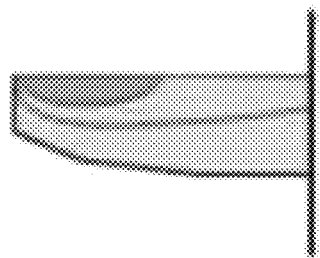
Figure 11:
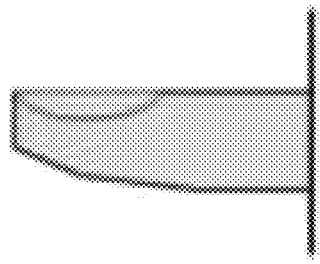
Figure 11:
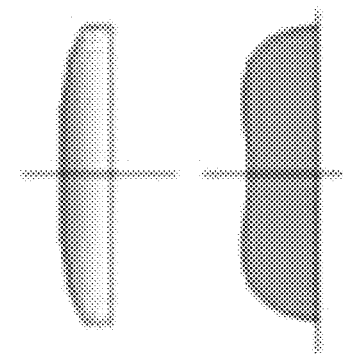
Figure 12:
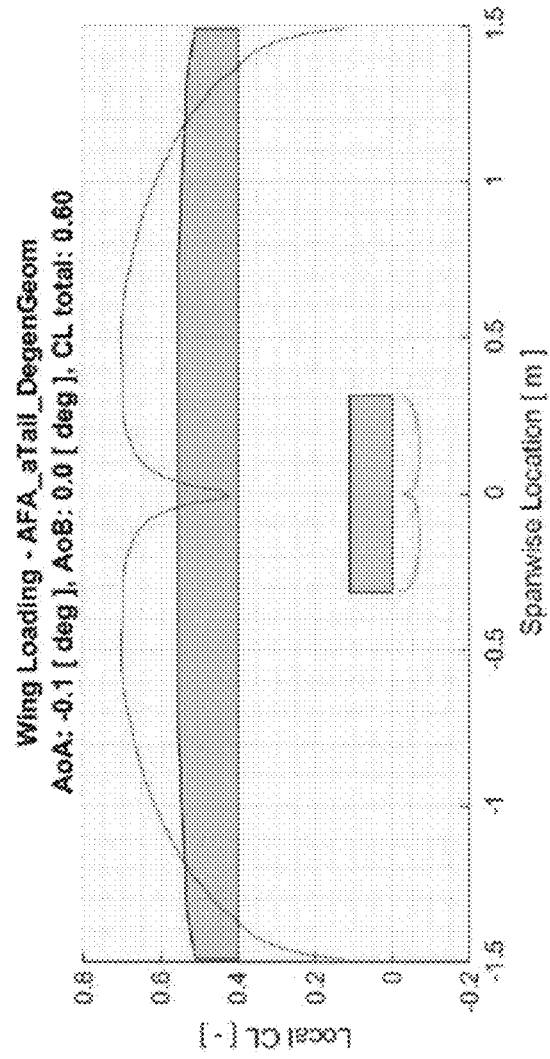
FIG. 12 is a graphical illustration of a wing loading diagram in accordance with embodiments of the invention.
Figure 13:
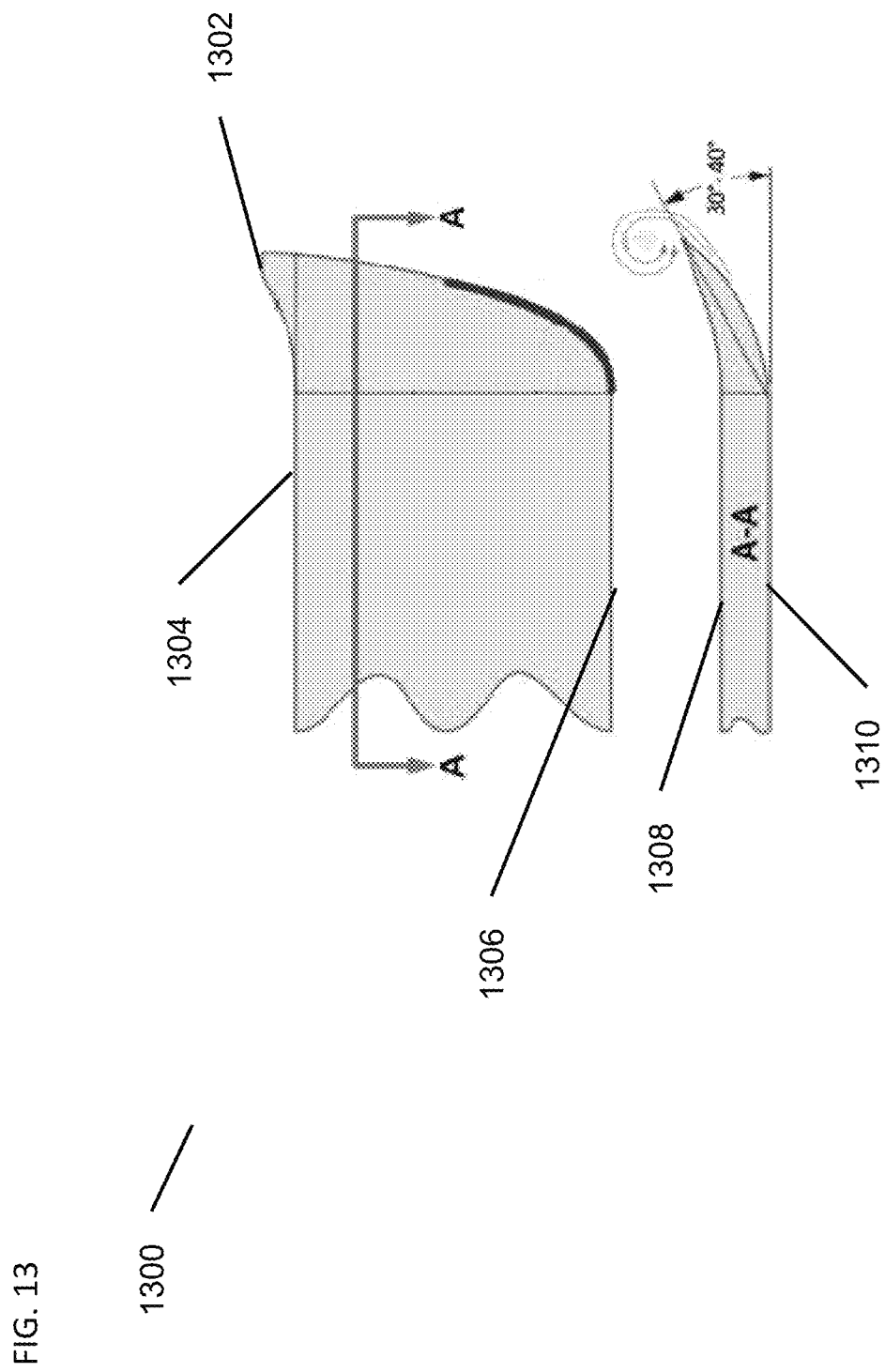
FIG. 13 illustrates a wing tip design in accordance with embodiments of the invention.

In some embodiments the wing design can be a modified Schuemann wing. The Schuemann wing design as shown in FIG. 11 can have reasonably constant wing loading but poor stall characteristic that can cause the aircraft to tip stall due to the increased lift loading at the tips. Various embodiments can modify this design with an altered degree of washout into the wing starting at the end of the main wing section and linearly varying throughout the wing tip. Some embodiments may use a 3-degree washout, which can provide for a well-rounded wing loading as shown by the graphical illustration in FIG. 12. Additionally, such embodiments exhibit a higher than typical taper ratio of 0.7 which ensures that the Reynolds number at the wing tip stays similar to that of the main wing. This helps to ensure the lift producing capabilities of the wing are constant with respect to airspeed. As can be appreciated the wing tip design can have an affect on the overall function of the aircraft and such modifications to the wing tip can be combined with one or more of the airfoil designs illustrated in FIG. 10. Additionally, given the nature of many of the combined design characteristics, wing tips can be optimized for both aerodynamic performance and aesthetic considerations as well. For example, some fixed wing elements can have a wing tip design similar to that illustrated in FIG. 13, with a contoured wing tip 1300. While the contoured element 1302 on the trailing edge 1304 is primarily for aesthetic considerations, the rounded or contoured leading edge 1306 can be adjusted and/modified for aerodynamic performance. Furthermore, the upper and lower wing surfaces (1308 & 1310) can be shaped to some degree for aerodynamic performance of the overall wing.

Figure 14:
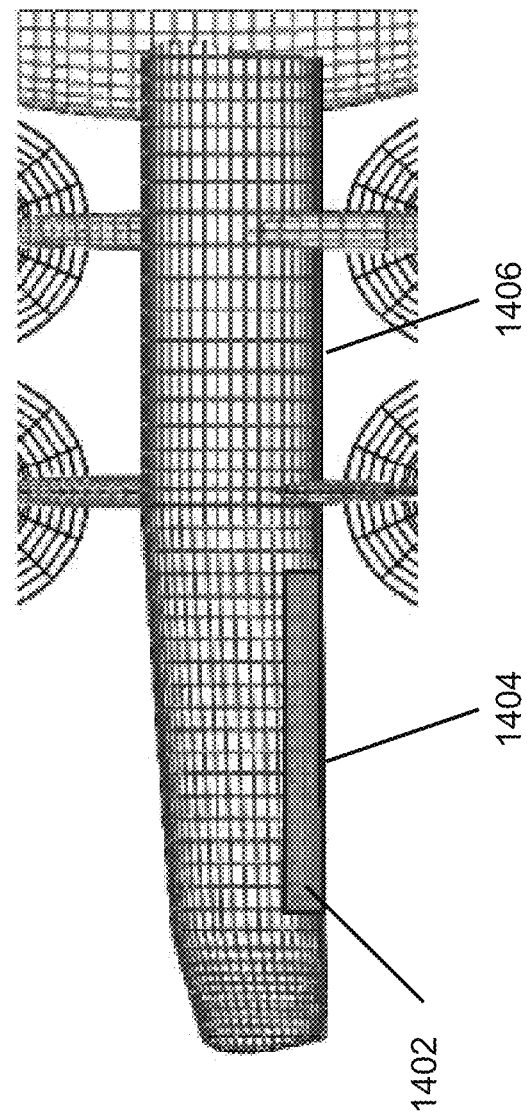
FIG. 14 illustrates a view of a wing design with a control surface in accordance with embodiments of the invention.

As can be appreciated, wing elements can have a number of different control surfaces that can be used to alter or adjust the flow of air over the surface of the wing. Control surfaces are typically used to increase or decrease the drag on the wing by essentially altering the profile of the wing. In many embodiments, the wing elements can be equipped with ailerons or flaps as illustrated in FIG. 14. For example, the aileron 1402 might have an external edge 1404 that is flush with the trailing edge 1406 of the wing 1408. The aileron can also help to control the steady state roll rate of the aircraft.

Figure 15A:
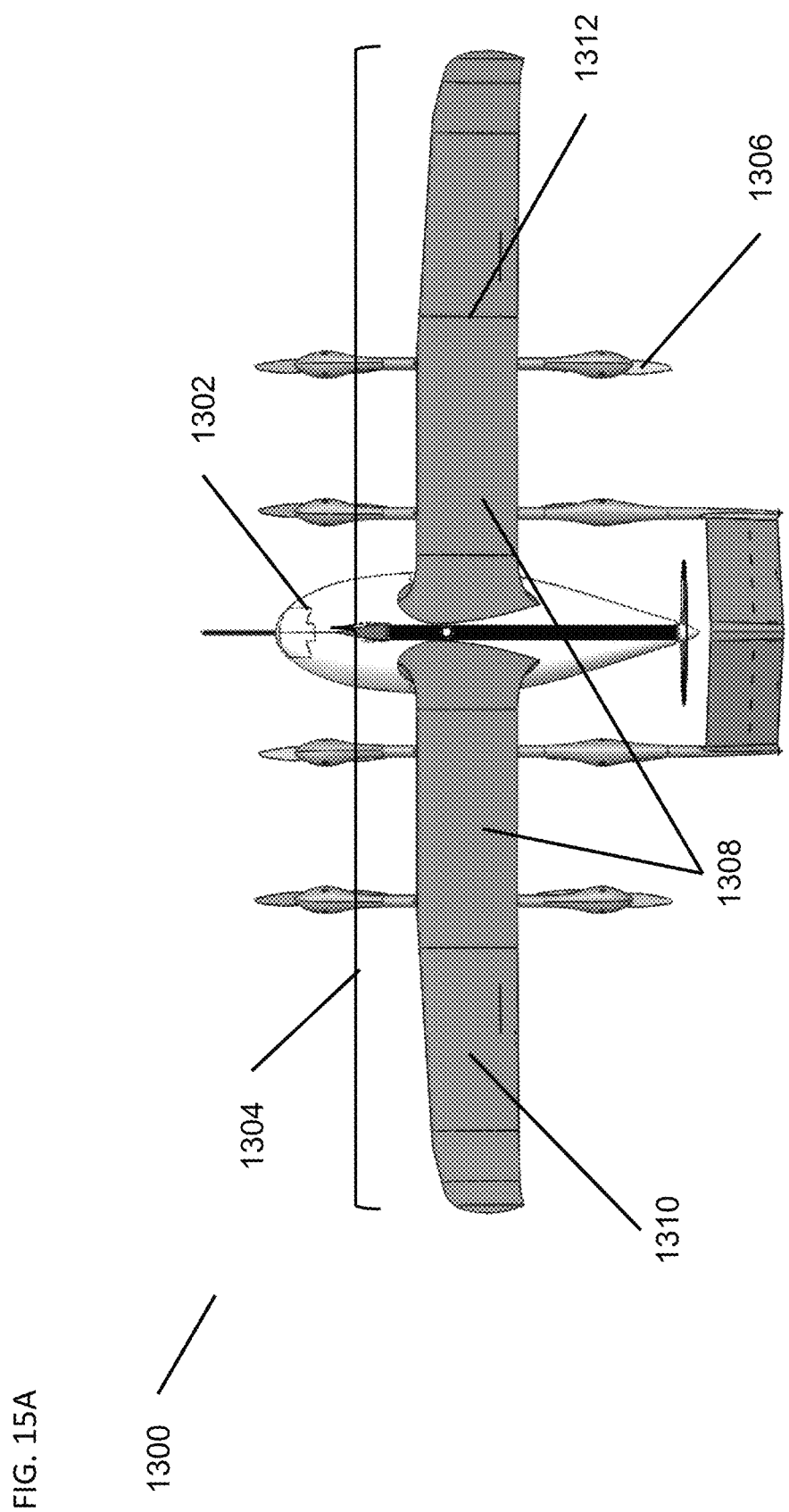
FIG. 15A illustrates a top view of an air transport vehicle with the wings extended in accordance with embodiments of the invention.
Figure 15B:
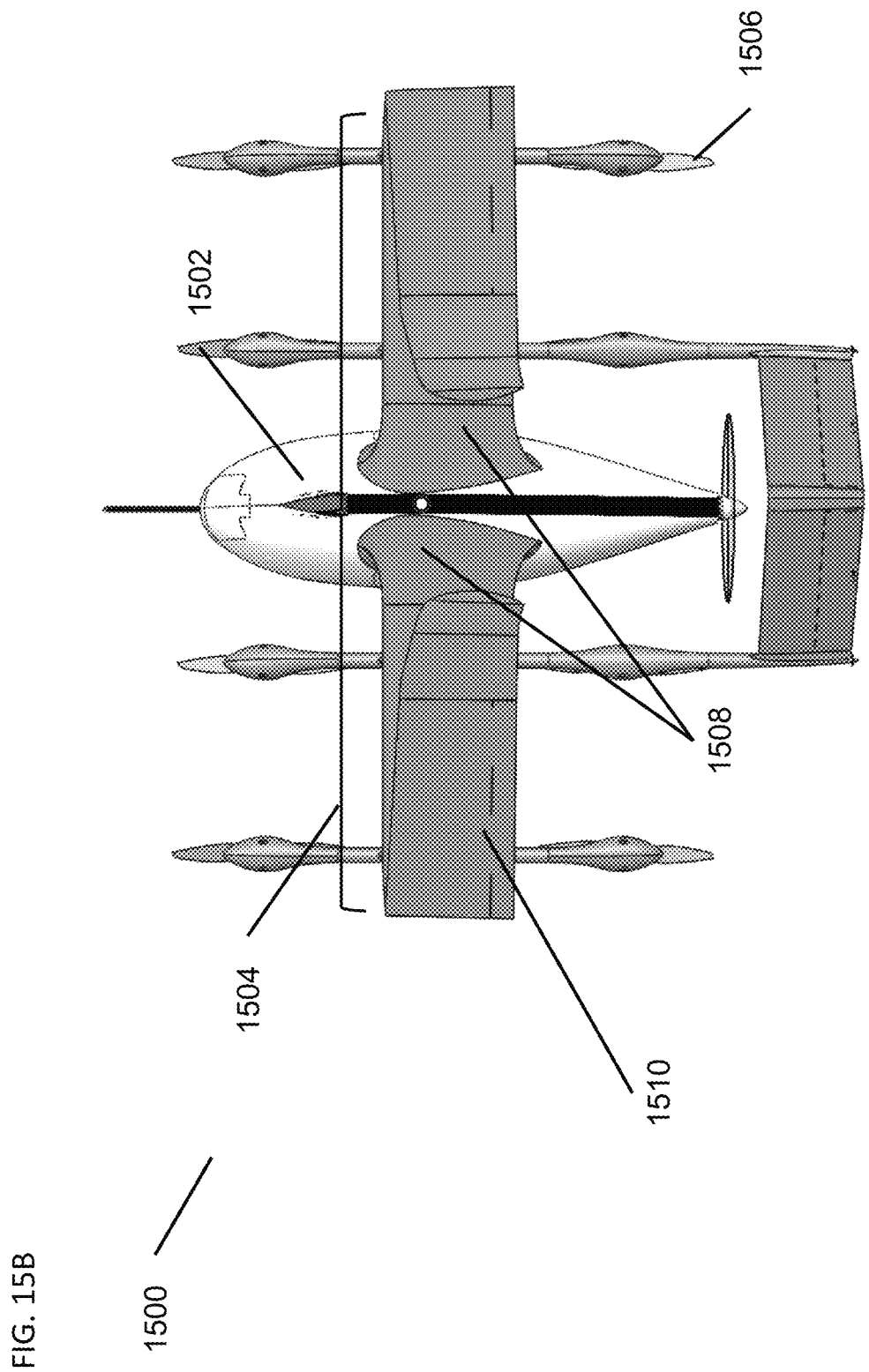
FIG. 15B illustrates a top view of an air transport vehicle with the wings folded in accordance with embodiments of the invention.

As has been previously discussed, numerous embodiments of the aircraft can be configured to be positioned within previously difficult to reach areas. This can be difficult with aircraft that have fixed wings because of their limited footprint. As such, numerous embodiments can be configured with foldable wings. For example, FIGS. 15A and 15B illustrate an embodiment of an air transport vehicle 1500 with foldable wings. Many embodiments have a similar configuration as that illustrated in FIGS. 5 and 6 with a fuselage 1502 and a fixed wing element 1504 with a number of rotors 1506 connected to the fixed wing 1504. The wing 1502 can have a fixed portion 1508 that is connected to the fuselage 1502. The wing 1502 also has a moveable portion 1510 that extends beyond the fixed portion and is connected thereto by a hinged element 1512. The hinged element 1512 can allow the moveable portion to fold over onto the fixed portion 1508 as illustrated in FIG. 15B. The folding of the wings can effectively reduce the width of the aircraft 1500. This can allow the rotors 1506 to control the movement of the aircraft 1500 into a number of tight-fitting situations such as mountainous terrains. As can be appreciated, the hinged element 1512 can have any suitable configurations such as a physical hinge or a skinned element that connects the moveable portion 1510 and the fixed portion 1508.

Embodiments of Rotors

Figure 16A:
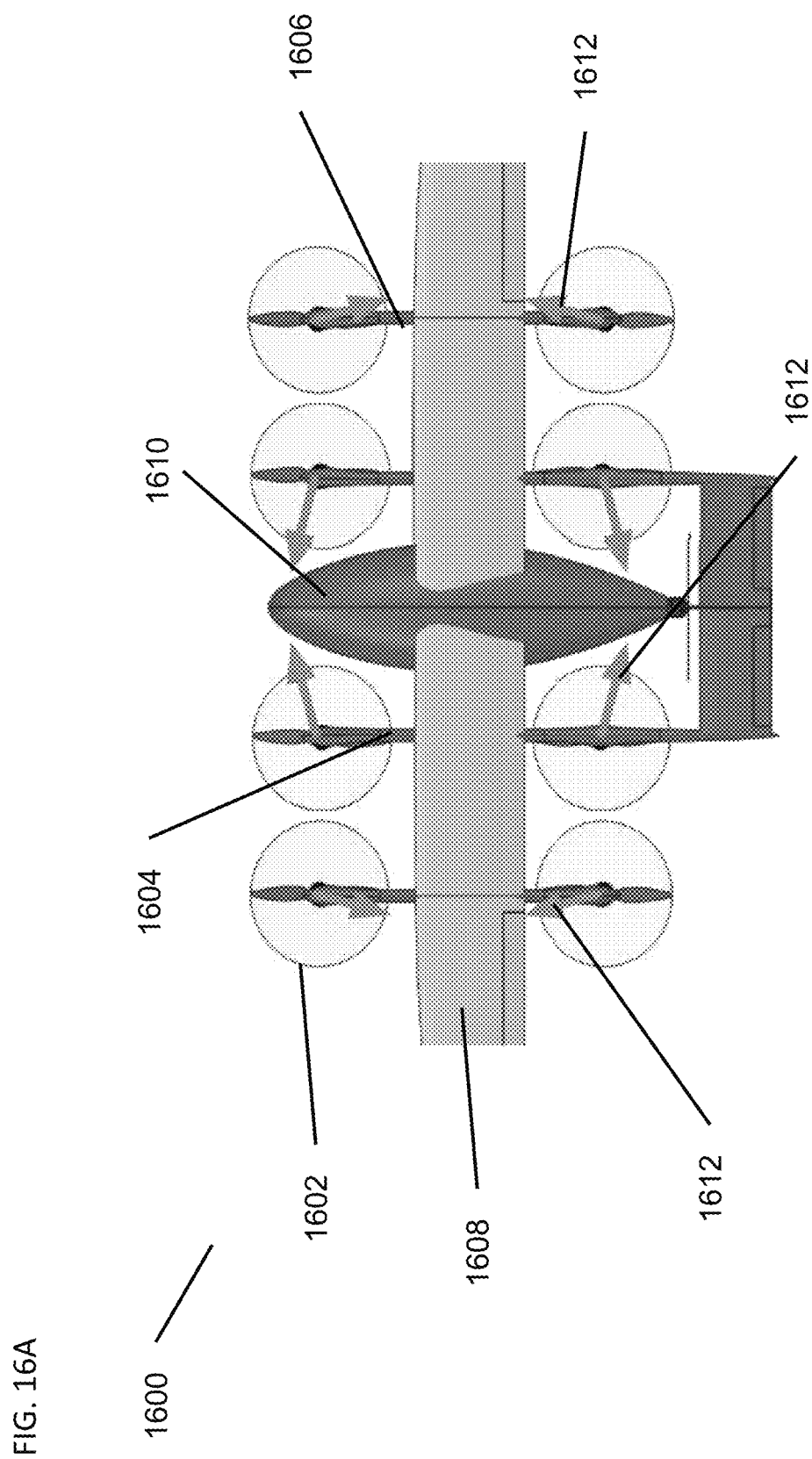
Figure 16B:
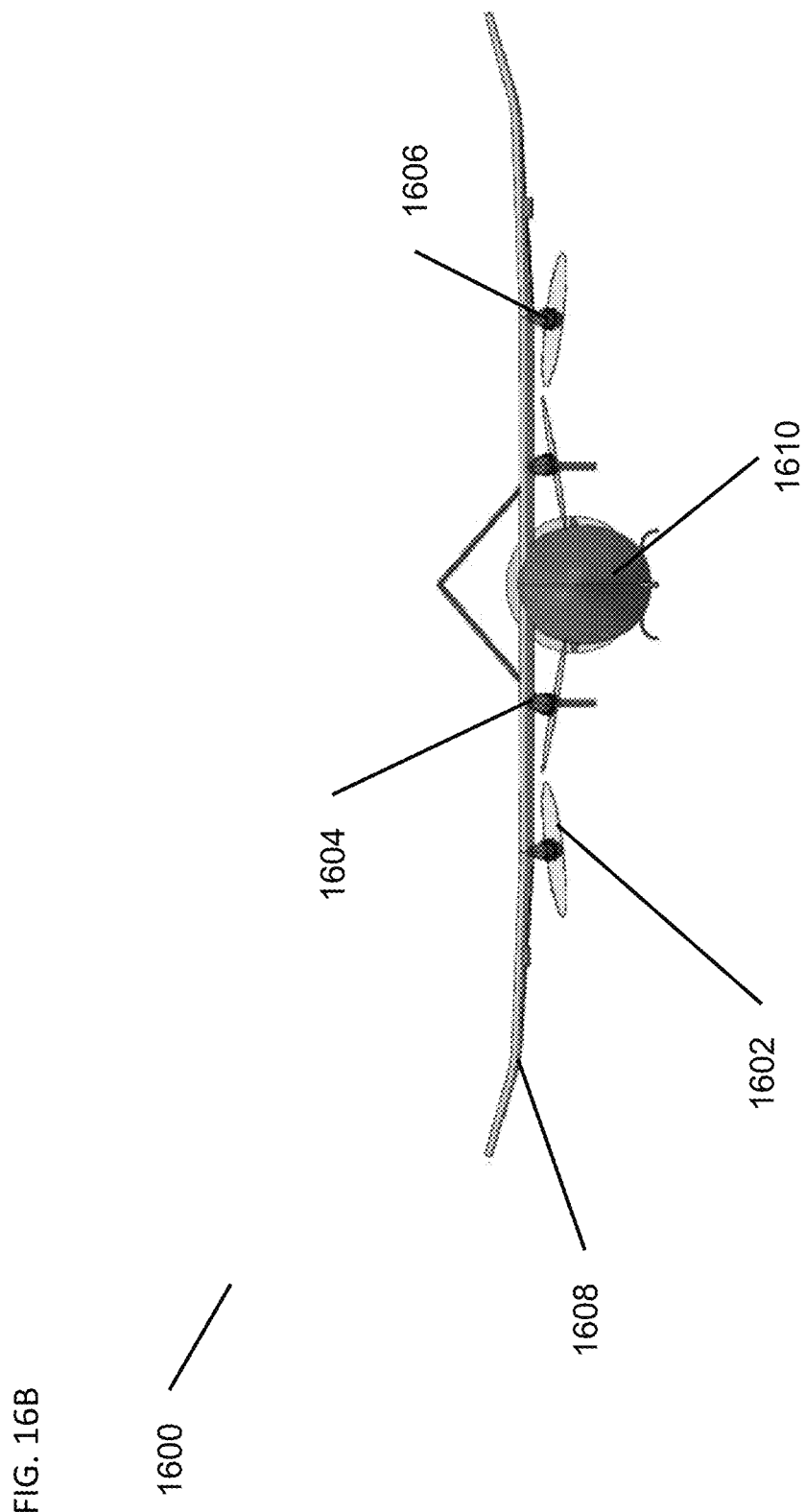

The various embodiments described herein can be adapted to operate in a number of different environments. In accordance with a number of embodiments, aerial transport aircrafts can be configured with a number of rotors to generate vertical thrust of the aircraft. However, in order to improve the overall stability and function of the aircraft, many embodiments can configure the rotors in a fixed tilt orientation. For example, FIGS. 16A through 16C illustrate an embodiment of an aerial transport aircraft 1600 with a number of rotors 1602 connected to ends of booms (1604 & 1606) that are subsequently attached to fixed wing elements 1608 positioned on an upper portion of a fuselage 1610. Various embodiments may have a set of inside booms or rails 1604 and outside booms or rails 1608. Although the aircraft in 16A is shown in the top view, the rotor indicator arrows 1612 illustrate the direction of tilt that each of the respective rotors 1602. For example, some rotors 1602 are tilted toward the fuselage and others may be tilted towards the wing 1608 and/or away from the fuselage 1610.

The tilting of the rotors can take advantage of various improved flight characteristics by generating thrust in different directions. Such tilt allows for a full six degrees of freedom (DoF) controls with three moments and three torques independently. This also will allow for some side force generation capability by reducing the need for the aircraft to change attitude to generate a side-force. In addition to the increased bandwidth generated by tilting the rotors slightly, the tilt can improve the maneuverability of the aircraft in both hover and flight modes even when operating close to the ground. Furthermore, the stability of the flight can be more appropriately managed in the event of reverse airflow over the aircraft. For example, if the aircraft were to operate in a reverse mode for positioning purposes, the overall tilt of the rotors can help to stabilize the flight and maintain control in the event a tail wind or other disturbance were to impact the aircraft. In reverse flight the aerodynamic moments dur to flow angles, especially in yaw, are much stronger. Therefore, tilting of rotors 1602 can increase yaw authority on the aircraft 1600.

In order to maintain yaw authority rotor tilt must be carefully calculated in order to prevent one or more rotors from becoming overloaded. For example, for a symmetric configuration there are four degrees of freedom to the tilt angle and tilt direction for both the inner and outer rails or booms of rotors that should be considered. Additionally, some embodiments may be optimized with respect to the lowest maximum motor thrust for a set of maneuvers. For example, some embodiments may consider 70% hover, 10% hover with roll-torque, 10% hover with pitch-torque and 10% hover with yaw-torque. Accordingly, the tilt angle for each of the rotors can be optimized for optimum flight performance. FIGS. 16B and 16C illustrate different views of an aerial transport aircraft with tilted rotors 1602. It can be seen the rotors 1602 on the outer rails 1606 are tilted away from the fuselage 1610 while the rotors 1602 on the inner rails 1604 are tilted towards the fuselage 1610.

Figure 17:
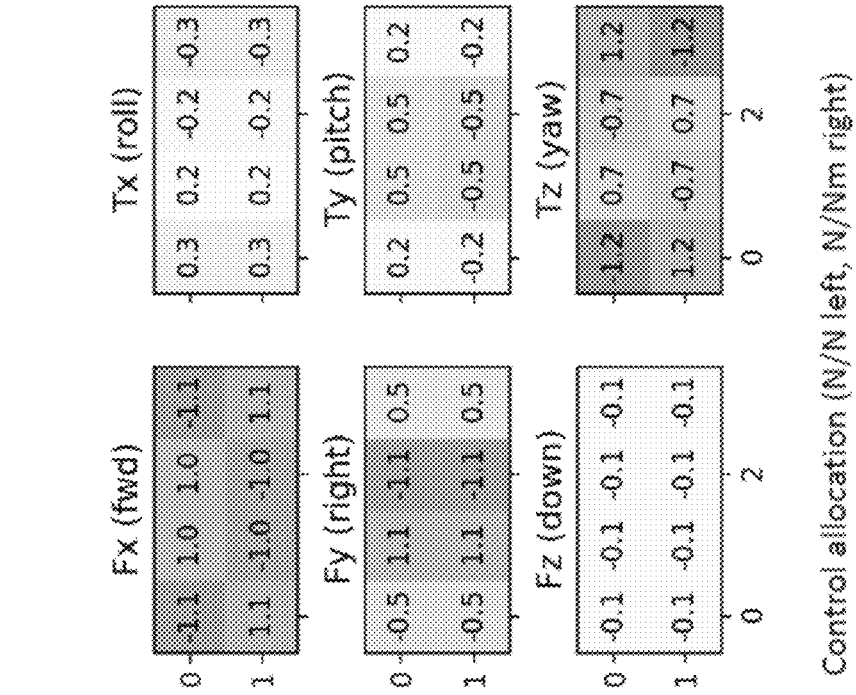
FIG. 17 is a tabular illustration of the various tilt tolerance of rotors in order to maintain thrust/hover control of the aircraft.

In addition to the improved aircraft control, the use of multiple rotors with a tilt configuration can help recover from an unknown motor failure. The multirotor tilt configuration can be trimmable to zero torque and hover thrust without saturating any of the thrusters and without changing the thrust allocation. As such, some embodiments can tilt the rotors any number angles that improve the flight characteristics. For example, referring back to FIG. 16A, the title angle can be 73 degrees on the inner rails 1604 and −151 degrees on the outer rails 1606. Such angles can be one or both rotors on the respective rails. Accordingly, the various tilt angles can result in a force/torque allocation shown in FIG. 17. As can be appreciated the variation in angle can affect the flight characteristics of the aircraft. In some embodiments the angles viewed from above in FIG. 16A can result in the various tilt angles shown in FIGS. 16B and 16C. In some embodiments, the tilt angle can be as much as 11.3 degrees.

Embodiments of the Tail

Figure 18:
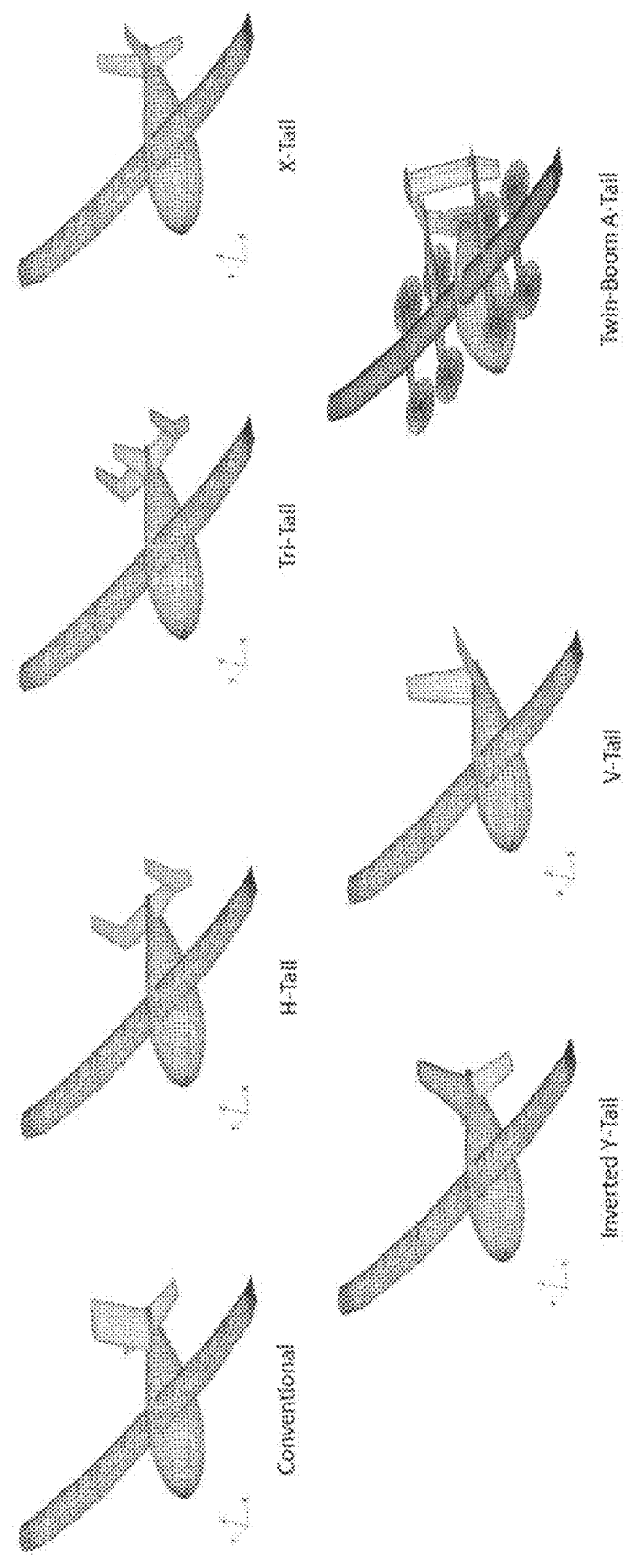
FIG. 18 illustrates various tail configurations on an air transport vehicle in accordance with embodiments of the invention.

The overall function of any aircraft can dramatically be affected by a tail or empennage. The empennage is typically a structure located at the rear of the aircraft and can have several elements to help stabilize and control the movement of the aircraft. Empennages can take on any number of configurations depending on the desired flight characteristics of the aircraft. For example, FIG. 18 illustrates various embodiments of an air transport vehicle 1800 with various tail designs that can be used with any number of embodiments of the overall aircraft. For example, some embodiments of the tail 1802 may have a convention tail with a vertical and horizontal stabilizer connected in what appears to be an inverted "T" shape. Other embodiments can use an "H" shaped tail or any of the other various tail configurations illustrated in FIG. 18 including, but not limited to, Tri tail, X-tail, inverted "Y" and/or a V tail.

Figure 19A:
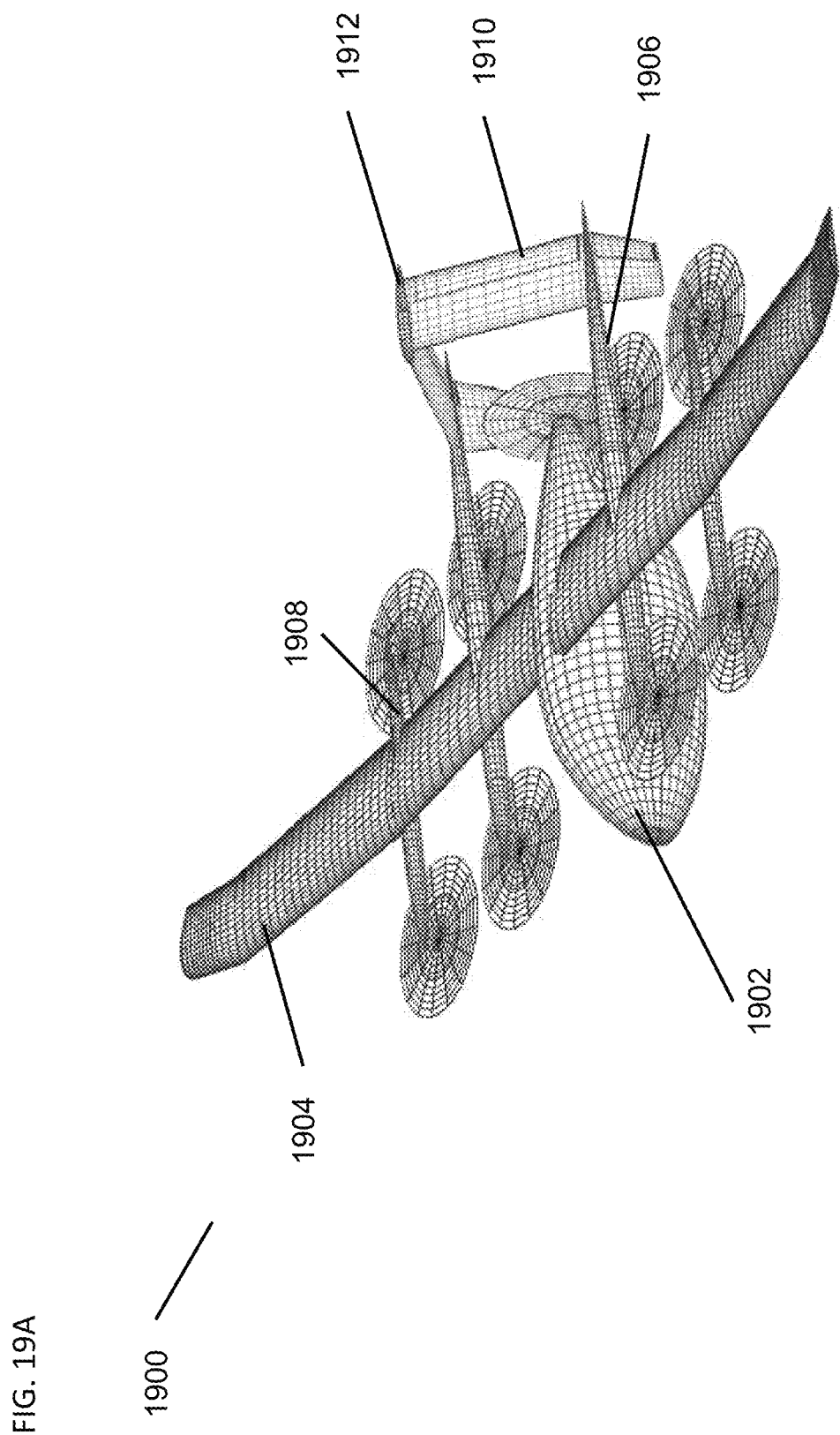
FIGS. 19A through 19C illustrate tail components in accordance with embodiments of the invention.
Figure 19C:
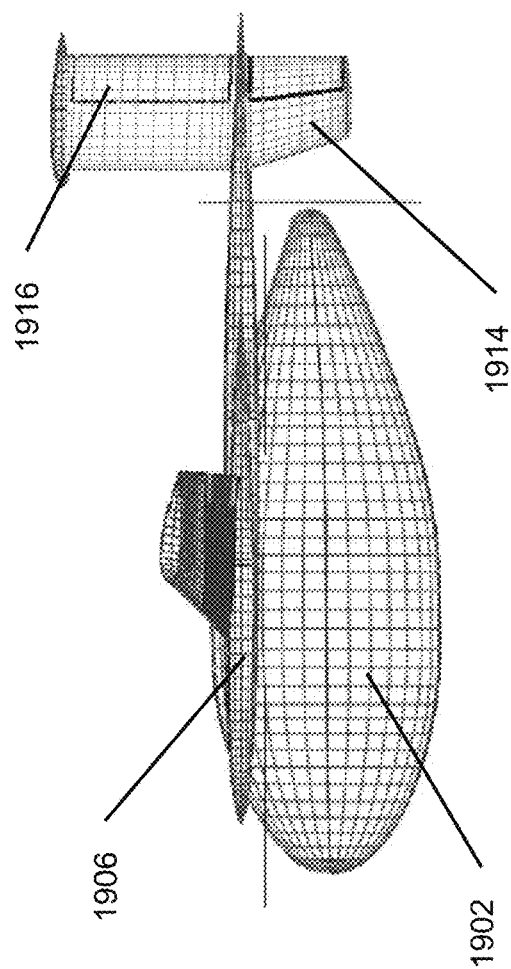
Figure 19B:
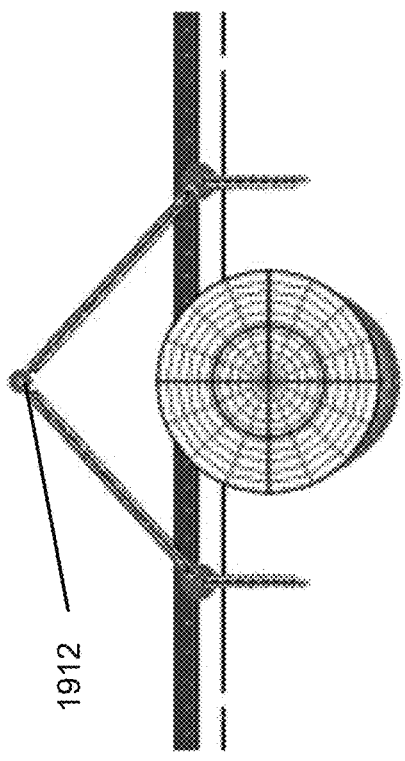

Additional embodiments may incorporate an "A" frame configuration. For example, FIGS. 19A through 19C illustrate an air transport vehicle 1900 with a fuselage 1902 and fixed wings 1904. Each of the fixed wings 1904 have inside 1906 and outside 1908 booms that are connected to the wings 1904. The inside booms 1906 can extend rearward and support the tail 1910 of the vehicle. In numerous embodiments the tail 1910 can take on an "A" shape where two of the stabilizers rise diagonally to an apex 1912. In some embodiments the "A" frame tail can also have vertical stabilizers 1914 that extend below the boom 1906 to provide additional stability to the aircraft during flight. As can be appreciated the length and profile shape of each of the components of the tail 1910 can take on any number of configurations. For example, some embodiments of a tail may incorporate additional control surfaces 1916 on either of the stabilizers. Stabilizers can improve the overall controllability of the aircraft such as improving pitch and yaw control similar to the use of control surfaces on the wings 1904.

Figure 20:
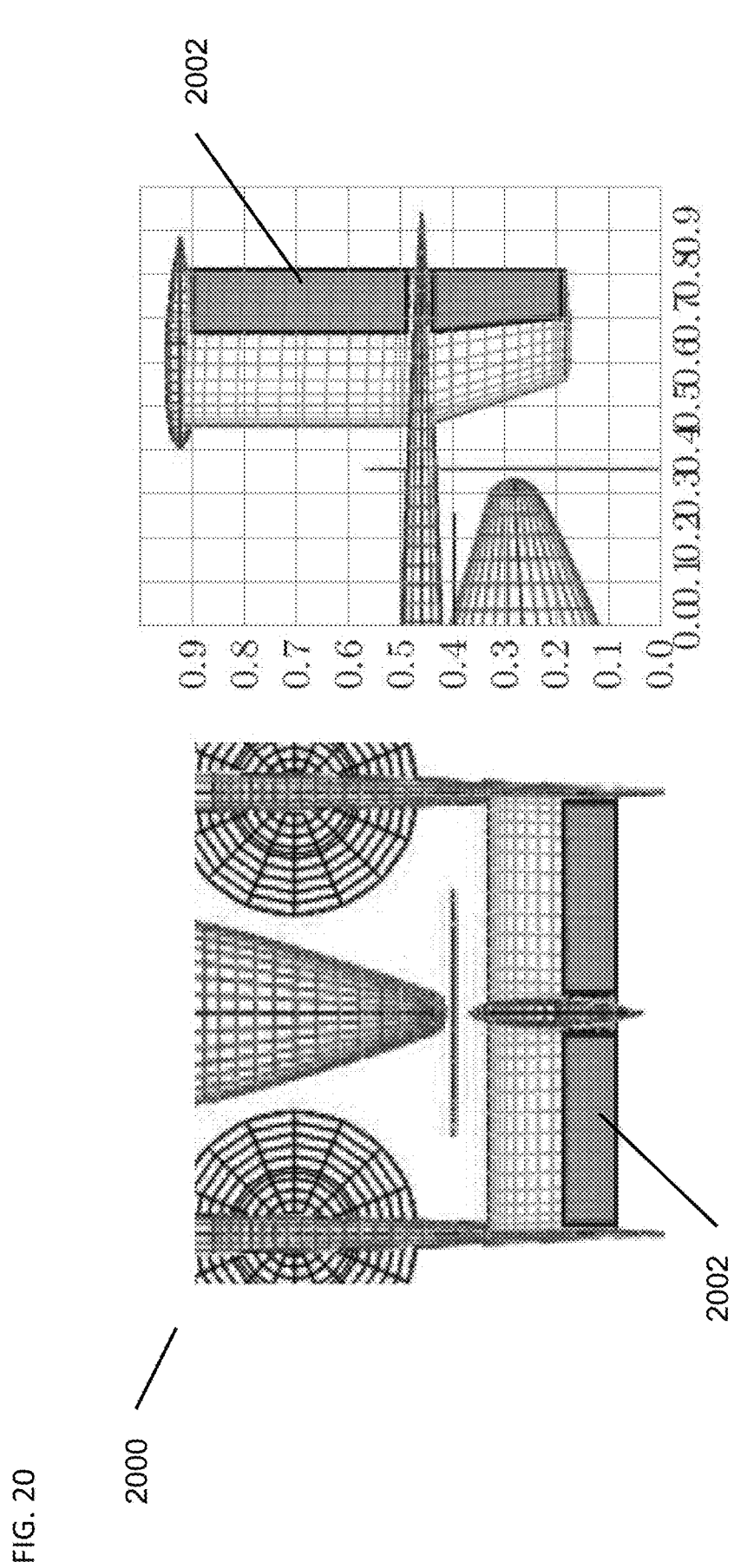
FIG. 20 illustrates a tail component with control surfaces in accordance with embodiments of the inventions.

Control surfaces can occupy various amounts of the surface area of the tail such that thy are able to maintain their overall function. FIG. 20 illustrates an example of a tail element 2000 with control surfaces 2002 in accordance with some embodiments. As can be seen the control surfaces 2002 can occupy a significant amount of the length of the respective tail elements so long as the function thereof does not affect the overall function of the tail 2000. Additionally, it is important that the movement of the control surfaces 2002 does not interfere with other elements or other control surfaces on the tail 2000.

Figure 21:
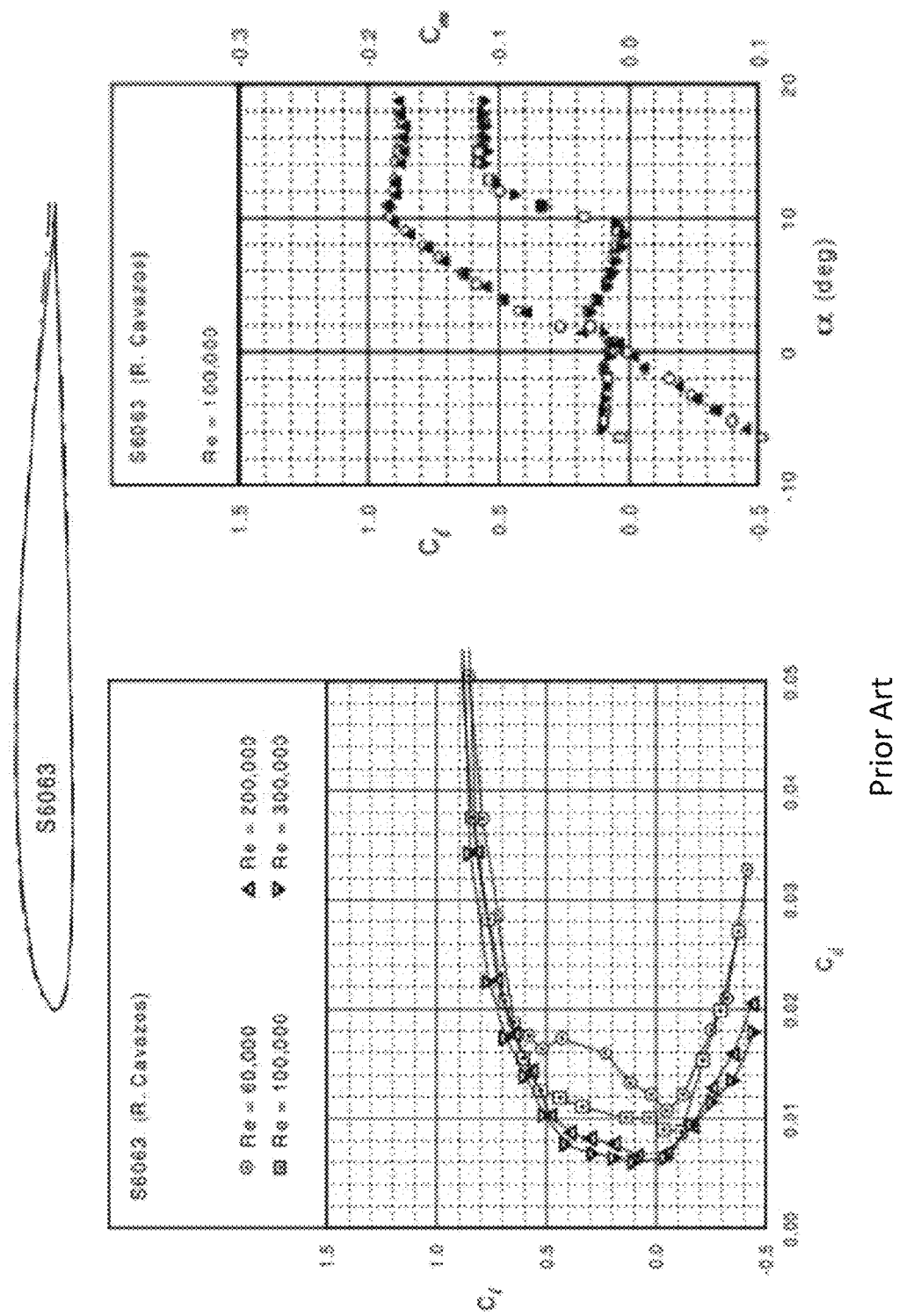
FIG. 21 illustrates an air profile design in accordance with known art.

As can be appreciated, the tail components can function similar to the wings in their interaction with the respective airflow over the surface of the tail. Accordingly, tail elements can have any number of profiles or airfoil designs that help to control the airflow over the surface. FIG. 21 illustrates an exemplary profile of an airfoil that can be used in the various stabilizer elements of a tail in accordance with numerous embodiments. Likewise, tail components can have a particular profile. For example, FIG. 20 illustrates an exemplary profile of an airfoil that can be used with the tail stabilizer elements.

Embodiments of the Fuselage

Throughout the specification it has been discussed that the various components that make up an aerial transport vehicle should be considered carefully with respect to their design and layout such that the overall function of the vehicle is not hindered by any one particular element. This is especially true for a vehicle that need to operate in a number of different environments such as the numerous embodiments described herein. As such the design of the fuselage can be an essential part of the overall vehicle. This can be an even greater need to consider when the fuselage is designed to carry a payload that can change as well as other necessary components such as electronics, power supplies and/or motor elements.

Figure 22:
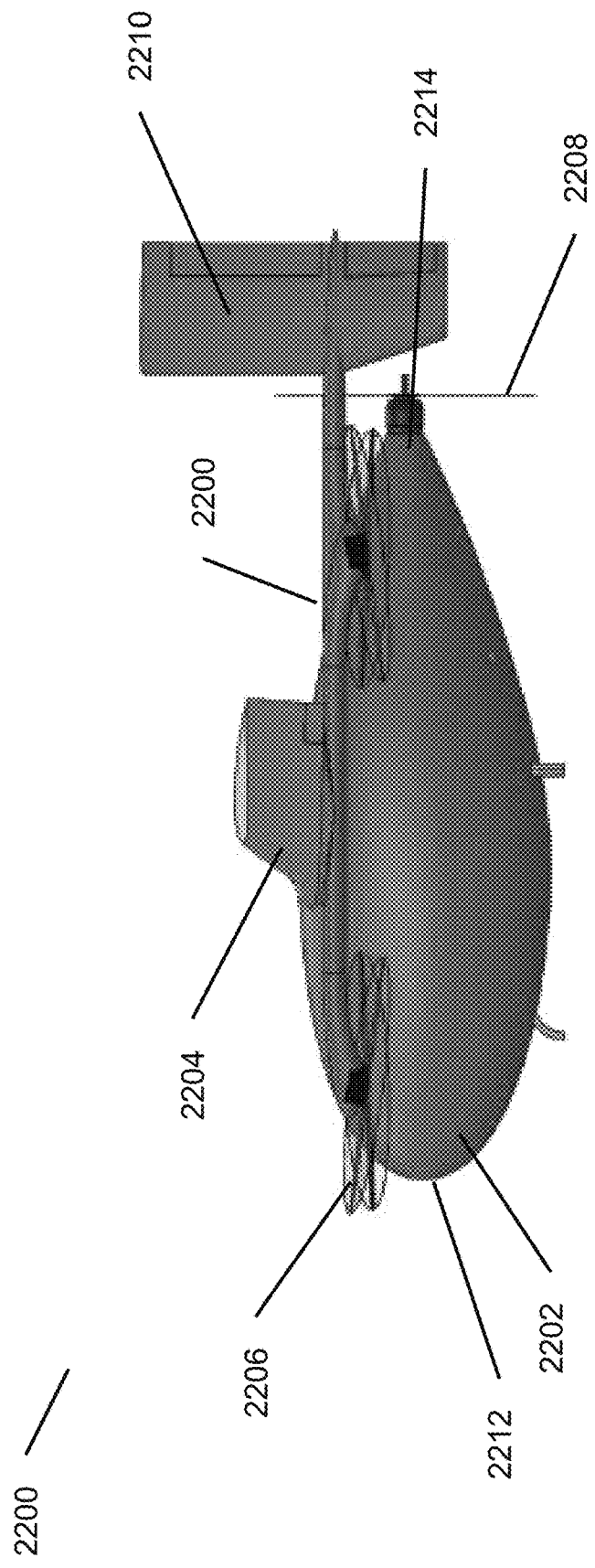
FIG. 22 illustrates a side view of an air transport vehicle with a tear drop shaped fuselage in accordance with embodiments of the invention.

FIG. 22 illustrates a side view of an air transport vehicle 2200 with a fuselage 2202 that is connected to wing elements 2204. Additionally, the aircraft can be equipped with vertical rotors 2206 and a horizontal rotor 2208. Each of the rotors can provide various types of thrust to propel the aircraft into the air and forward. Various embodiments can also have a tail component 2210 used to help control the movement of the aircraft. The fuselage 2202 can take on any number of shapes such as a teardrop shape or a rectangular type shape. The shape and configuration of the fuselage can be modified such that it is shortened to allow room for the rear rotor 2208 to be placed between the main fuselage 2202 and the tail 2210. The teardrop shape of the fuselage can have a contoured leading surface 2212 as well as a tapered trailing edge 2214 such that the flow of air over the fuselage prevents or reduces the turbulence and thus drag on the vehicle. Additionally, the configuration of the fuselage allows for a larger or taller center section of the vehicle can allow for improved entrance and exit capabilities of the fuselage for passengers.

Figure 23A:
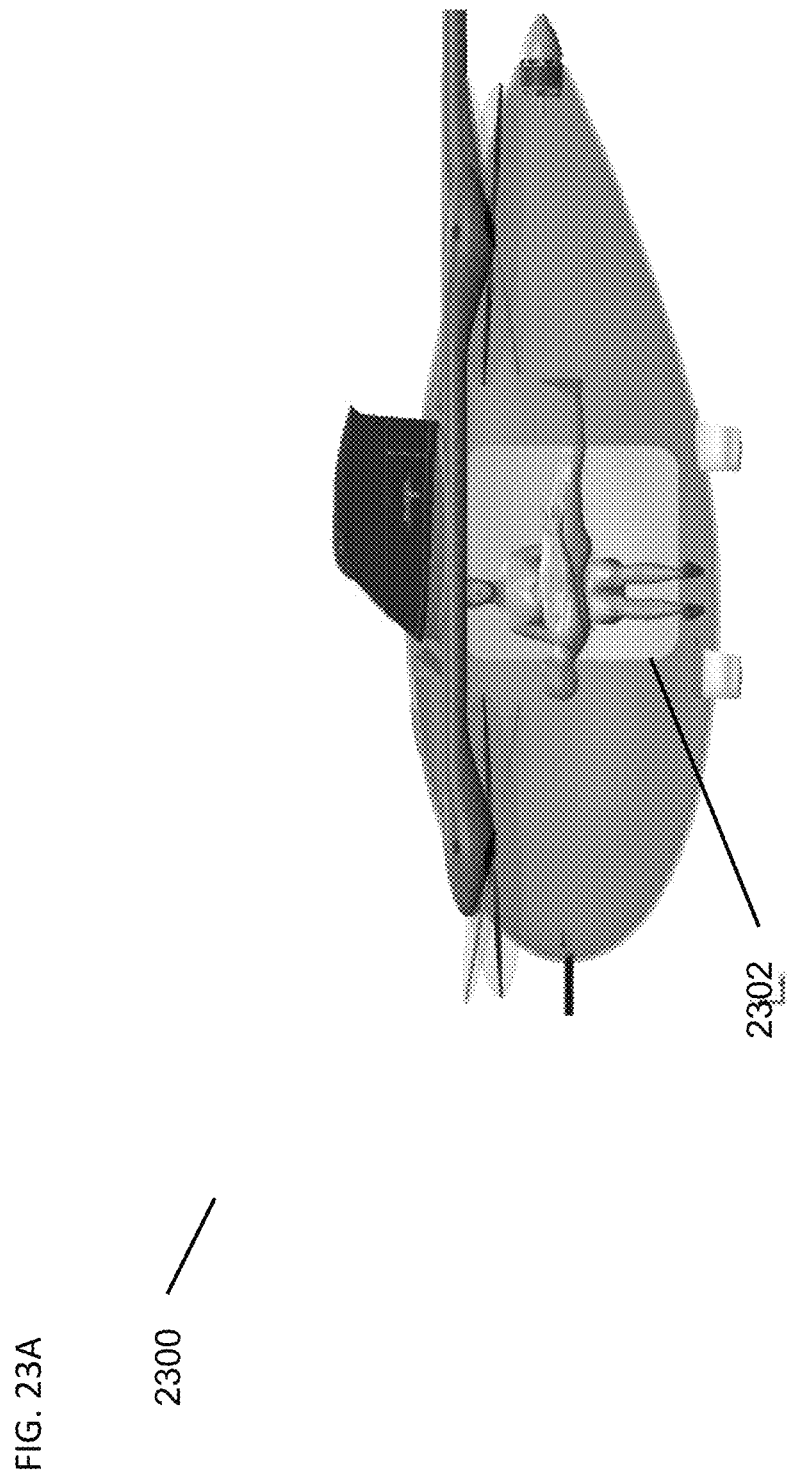
FIG. 23A illustrates a fuselage with an opening in the side in accordance with embodiments of the invention.
Figure 23B:
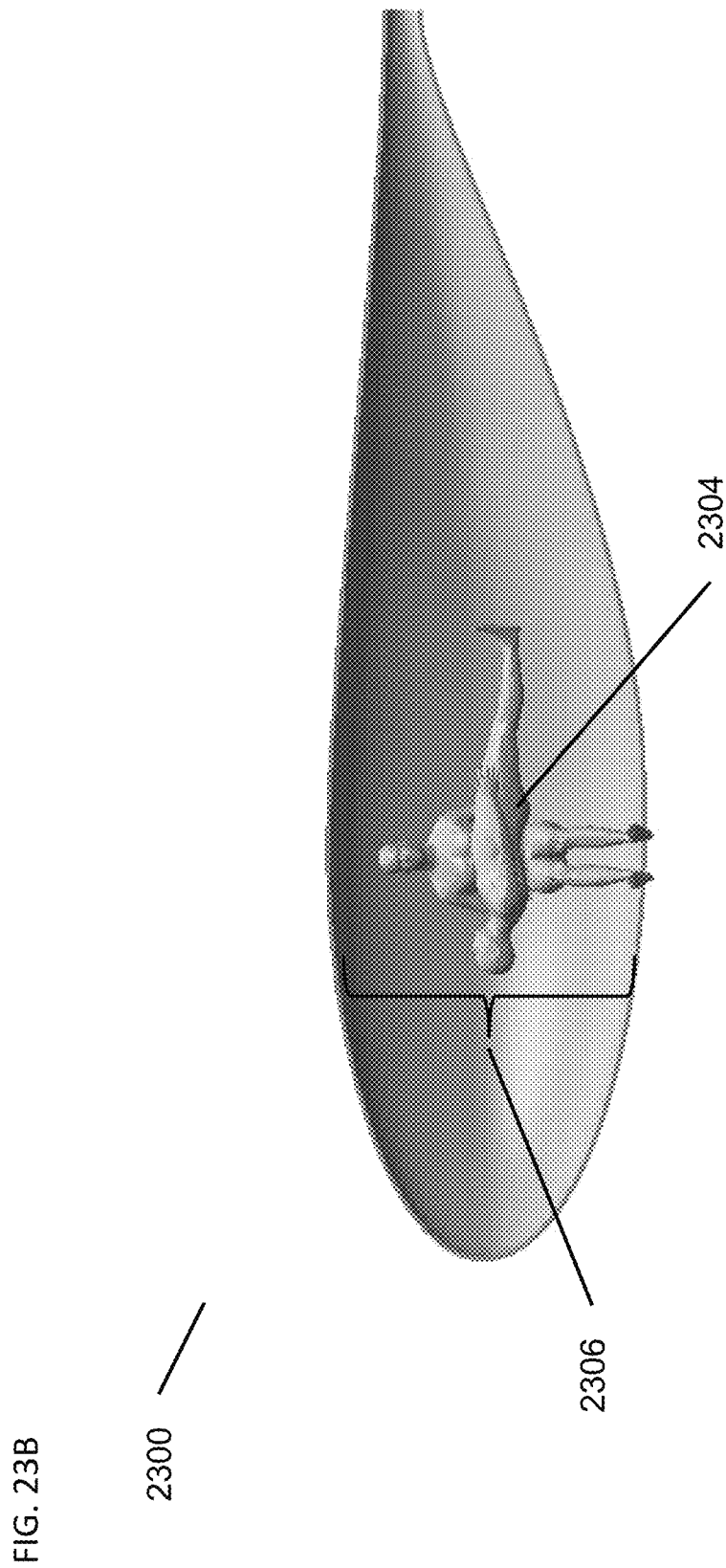
FIG. 23B illustrates a cross sectional view of a fuselage in accordance with embodiments of the invention.
Figure 24:
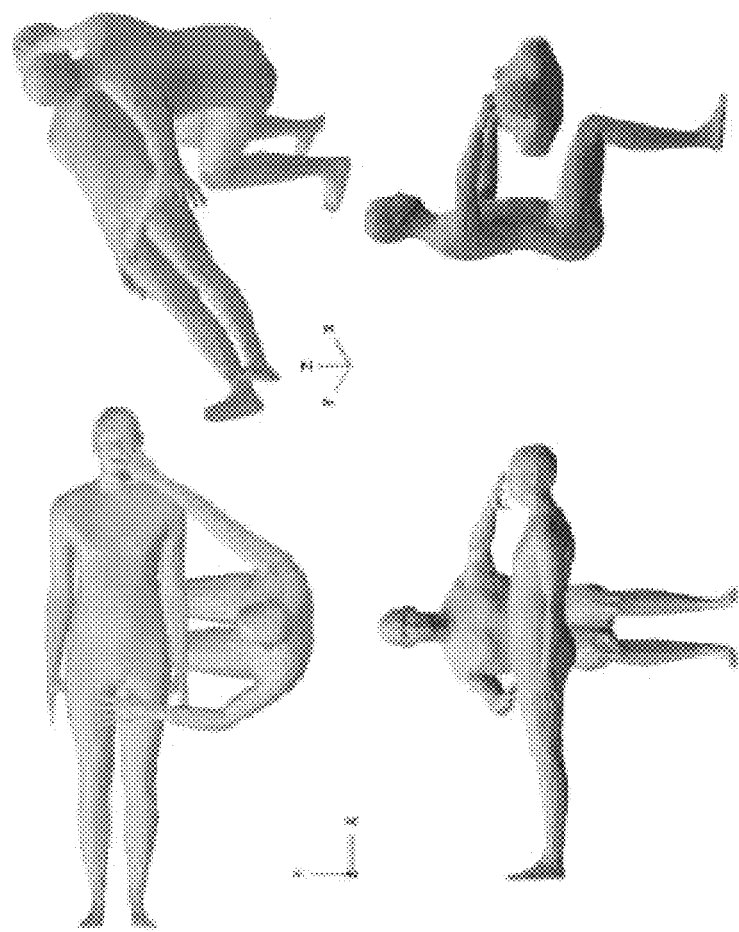
FIG. 24 is an illustration of various passenger positions.
Figure 25:
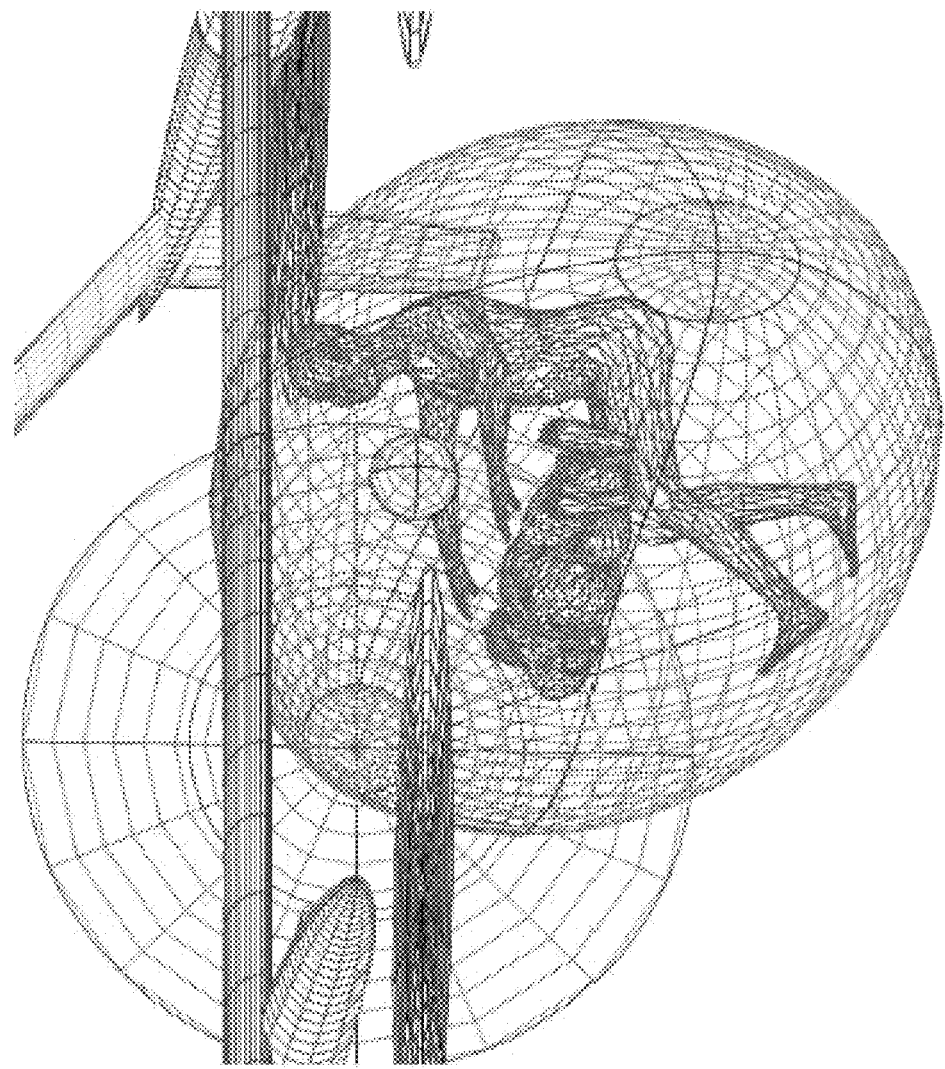
FIG. 25 illustrates a passenger configuration in a fuselage in accordance with embodiments of the invention.

The fuselage can be an important factor when considering the use of the aircraft for medical transport. Accordingly, the fuselage should provide ample room for one or more passengers to easily enter and exit the vehicle. FIG. 23A illustrates a sideview of an aircraft fuselage 2300 with an entrance 2302 on the side of the fuselage. As illustrated, the side entrance 2302 is configured to be large enough to allow for passengers to enter the vehicle with relative ease or at least without significant effort. This can be useful when one or more of the passengers may be partially limited in movement. FIG. 23B illustrates a cross sectional view of an elongated fuselage 2300 where the occupants 2304 are positioned near the center of mass and subsequently the largest or widest section 2306 of the fuselage. It can be appreciated that the elongated design can help in providing the balance the center of mass of the vehicle as well as offer improved aerodynamics for the vehicle. FIG. 24 illustrates various potential views of passengers and how they might be sitting in the fuselage. Similarly, FIG. 25 illustrates a schematic of a fuselage, similar to that in FIG. 23, with the placement of the passengers inside the body of the fuselage. FIG. 26 illustrates various views of a fuselage, including some cross-sectional views, in accordance with numerous embodiments. Similar to those illustrated in FIGS. 23 and 25, the fuselage 2600 can have a tear drop shape with a larger center section and narrowing towards the end. Although the embodiments illustrated show a fuselage with a side panel entrance, it should be understood that the entrance can be placed in any location that is suitable for the overall function of the vehicle. Additionally, it should be understood that other compartments or access panels can be used within the fuselage to all for access to the control electronics as well as any other item such as a storage compartment for medical supplies.

Various embodiments of an air transport vehicle have been described throughout. More specifically, numerous components such as rotors, motors, and electronic components have been briefly described in relation to the embodiments described herein. As can be appreciated, many embodiments may incorporate any number of different components in terms of motors, rotors, control electronics, etc., that can be used in the control and function of the aircraft. Additionally, it should be appreciated that the associated wiring and electronic circuitry used in the aircraft can be of any suitable form such that it fits within the respective form factor and the function of the aircraft.

DOCTRINE OF EQUIVALENTS

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims

What is claimed is:

1. An air transport vehicle comprising:
a fuselage having an outer surface that defines an upper section, a bottom section, a leading and trailing surface and an inner surface, wherein the inner surface defines an inner cavity,
an airfoil disposed near the upper section, where the airfoil has an elongated body that extends outwardly from the outer surface of the fuselage and wherein the airfoil is disposed about a center of mass of the fuselage;
a plurality of boom elements connected to a lower surface of the airfoil, each of the plurality of boom elements has an elongated body with a first end and a second end, where the first end is in a direction similar to the leading surface of the body and the second end is in a direction similar to the trailing surface;
a plurality of rotors connected to the plurality of booms, where at least one of the plurality of rotors is connected to the first end and at least another of the plurality of rotors is connected to the second end;
a tail element connected to at least a subset of the plurality of boom elements wherein the subset of the plurality of boom elements is disposed on the wings near the fuselage and wherein the tail element is disposed on a rearward portion of the subset of the plurality of boom elements;
wherein the airfoil is foldable between an open and closed configuration, the airfoil having a folding axis that is located outward from the plurality of boom elements; and
wherein the plurality of rotors can control the movement of the vehicle when the airfoil is in an open configuration and the plurality of rotors can control the movement of the vehicle when the airfoil is in a closed configuration.

2. The air transport vehicle of claim 1, wherein each of the plurality of rotors are connected to the plurality of boom elements with a fixed tilt angle.

3. The air transport vehicle of claim 2, wherein the fixed tilt angle is no more than 11.3 degrees.

4. The air transport vehicle of claim 2, wherein the fixed tilt angle of some of the plurality of rotors is selected from a group consisting of tilted towards the fuselage, tilted away from the fuselage, and tilted towards the wings.

5. The air transport vehicle of claim 1 wherein the air foil has one or more control surfaces.

6. The air transport vehicle of claim 1, wherein the tail element has an "A" shape configuration having at least two stabilizers each of the stabilizers are connected to the at least second set of booms and extend upwardly at an angle towards an apex of the tail.

7. The air transport vehicle of claim 6, wherein the tail element further comprises at least two vertical stabilizers that extend downward from a connection point of the at least two stabilizers and the at least second set of booms.

8. The air transport vehicle of claim 6, wherein each of the at least two stabilizers have at least one control surface.

9. The air transport vehicle of claim 7, wherein each of the at least two vertical stabilizers have at least one control surface.

10. The air transport vehicle of claim 1, further comprising a horizontal thruster rotor disposed at an end of the fuselage near the trailing surface and configured to generate a forward thrust for the vehicle.

11. The air transport vehicle of claim 10, wherein the horizontal thruster rotor is positioned such that it sits between the trailing surface of the fuselage and a leading edge of the tail.

12. The air transport vehicle of claim 1, further comprising a landing mechanism disposed on the bottom section of the fuselage.

13. The air transport vehicle of claim 12, wherein the landing mechanism is selected from a group consisting of landing skids and wheels.

14. The air transport vehicle of claim 1, wherein the fuselage has a tear drop shape such that the leading surface is contoured and the trailing surface is tapered toward a connection point.

15. The air transport vehicle of claim 1, wherein the fuselage has at least one opening such that the opening is configured to allow at least one passenger to be positioned within the internal cavity of the fuselage, and wherein the positioning of the passenger does not disturb the center of mass of the fuselage.

16. The air transport vehicle of claim 1, further comprising a plurality of openings that allow for the positioning of control electronics for the vehicle.

17. The air transport vehicle of claim 15, wherein the fuselage is configured to hold at least two passengers.

18. The air transport vehicle of claim 1, wherein each of the plurality of rotors has a shroud that encircles each of the plurality of rotors.

* * * * *